United States Patent
Dame

[15] 3,670,303
[45] June 13, 1972

[54] TRANSPONDER MONITORING SYSTEM

[72] Inventor: John S. Dame, Oak Park, Ill.

[73] Assignee: Motorola, Inc., Franklin Park, Ill.

[22] Filed: Aug. 28, 1970

[21] Appl. No.: 67,875

[52] U.S. Cl. .................... 340/146.1 C, 340/147 C, 340/163
[51] Int. Cl. ................................................. G08b 29/00
[58] Field of Search ............... 340/146.1, 163, 147 C, 408, 340/47, 150

[56] References Cited

UNITED STATES PATENTS

| | | | |
|---|---|---|---|
| 3,159,816 | 12/1964 | Tiemann............................340/147 |
| 2,740,106 | 3/1956 | Phelps.................................340/147 |
| 2,155,554 | 4/1939 | Judge...............................340/146.1 X |
| 3,268,862 | 8/1966 | Pettitt..............................340/146.1 X |
| 3,513,443 | 5/1970 | Anderson..........................340/163 X |

Primary Examiner—Charles E. Atkinson
Attorney—Mueller & Aichele

[57] ABSTRACT

A transponder monitoring system includes a fixed location interrogation station and transponder units carried by vehicles, with the transponder units being placed in an activated transmit mode in response to interrogation pulses transmitted by the interrogation station. The messages received at the interrogation station are verified by the transmission of verification pulses on a bit by bit basis, with failure of verification causing a vehicle transponder unit to be reset to begin transmission over again. This permits an orderly response from the vehicle units to be obtained even though several units may be within the interrogation field at the same time and may be simultaneously attempting to transmit information to the interrogation station. Upon completion of transmission of an error free (verified) message from a transponder, the transponder is disabled from further transmission until the vehicle leaves the interrogation field.

25 Claims, 6 Drawing Figures

INVENTOR
JOHN S. DAME
BY
Mueller & Aichele
ATTYS.

TRANSPONDER MONITORING SYSTEM

BACKGROUND OF THE INVENTION

It often is desirable to identify and monitor moving vehicles from a fixed location in order to determine the location of the moving vehicles at periodic intervals and also to determine variable information relating to particular conditions to be monitored in the vehicles. In addition there is a need for monitoring a number of fixed transponders from a central location, or from a mobile interrogation unit, such as an automatic meter reading system. Several techniques have been developed for accomplishing these results, for example such as sending a coded message to the vehicle or fixed transponder identifying the vehicle or transponder and requesting a response from it. The vehicle or transponder, upon receipt of its unique code, then provides a reply to the monitor. Such a technique however, generally requires that the vehicle or transponder have relatively sophisticated electronic equipment; and where large numbers of vehicles or transponders are involved, the cost of such a system can be prohibitive. In addition this technique requires some advance information concerning a vehicle or transponder, so that it may be directly and properly addressed at the proper time; and when a large number of unique address codes must be transmitted by the monitor, a severe timing restriction exists.

Where a large number of transponders are to be interrogated at substantially the same time, such as in a railroad freight train in which the freight cars are to be monitored or in a meter monitoring system, normal radio communication presents problems unless a selective address coding scheme for each of the transponders is used. Since many of the transponders may receive the interrogation signals simultaneously, there must be some means by which the reply from one transponder can be separated from that of another in time or frequency. All of these requirements have caused radio transmission equipment to become very costly for this type of monitoring.

Systems involving a lower cost for vehicle units have been proposed in which the use of color coding is employed for the identification and monitoring of vehicles such as railroad freight cars, the number of which is high and which may be arranged in any random order in any particular train. In such systems, color signal patches are positioned on each of the freight cars which are to be monitored by a highly directive light beam positioned alongside the track. Although color-coded patches are relatively inexpensive and also provide means for identifying each of the cars without interference from another, there are several drawbacks to color coding systems. For example, the directive light beam is reflected from other parts of the cars as they pass, so that the coding scheme used must be more complex than would be required if only the color patches were scanned by the light beam in order to distinguish the color coded signal from background noise. In addition fading of the code patches and extreme weather conditions, such as ice and snow, require that the code patches have sufficient redundancy to permit the message to be read, even through parts of the code patch are missed or obscured. Even if such redundancy is provided, however, the patches may become temporarily obliterated or the track side unit may become blocked, rendering the system temporarily inoperative.

In the interests of operating simplicity and cost, it may be desirable to accept these limitations of color-code patch systems. The code patch systems, however, have other limitations which are unacceptable for some monitoring requirements. For example, with refrigerator freight cars which are to be monitored to determine whether or not the ears are operating properly and the temperature inside is within predetermined safe ranges, a more complex system than can be provided by this simple code patch is required, since simple code patch systems only provide fixed information such as car or vehicle identification.

The code patch method can provide variable information relating to the temperature of refrigerator cars and the like by placing the code patch on a revolving drum, with the particular code displayed indicating the information concerning the car which is to be monitored. Thus, as conditions within the car change, the drum rotates to change the code signal which is presented for interrogation by the track-side unit. Although a rotating drum system may be made to convey the desired information, the cost factors which dictate the use of the code patch when a simple identification interrogation is the only requirement make the use of the drum containing the code patch very much less attractive. This results from the increased cost of the mechanical apparatus which is required to position the drum. In addition, since the order and direction in which the cars are placed in a freight train is random and since the railroad cars or the piggy-back truck trailers can be positioned in either direction on the train, either two code patch drums are required, one on each side of the car, or interrogating or scanning units must be placed on both sides of the track at each interrogation location. Even if a code patch drum system is employed, the problems of the sensitivity of this system to the position of the code patch and to weather are not overcome. Further the reliability of operation of the necessary mechanical apparatus in extreme weather conditions and under the extreme vibration to be found in the environment of the freight car is questionable.

As a consequence, it is desirable to provide a radio transmission system requiring minimal sophistication in the transponder located in the freight car or piggy-back trailer, so that the advantages of radio transmission may be realized without the attendant prohibitive cost for the transponder units ordinarily associated with such systems. In addition it is desirable to minimize the requirement of the vehicle identification coding to be transmitted by the interrogation station to the vehicle for initiating a response from the vehicle transponder, so that the station decoding equipment can be substantially simplified.

SUMMARY OF THE INVENTION

Accordingly it is an object of this invention to provide an improved transponder identification and monitoring system.

It is another object of this invention to provide a transponder identification and monitoring system with verification at the transponder of the accuracy of the received message at an interrogation station.

It is an additional object of this invention to use a unique verification code sequence for error checking messages transmitted from a transponder to an interrogation station on a bit!-by-bit basis.

It is yet another object of this invention to employ a buffer storage circuit in an interrogation station permitting the storage and removal of messages therefrom at different bit rates to accomodate differences in the rate of transmission from a transponder and the rate at which data can be utilized by a utilization device.

In accordance with a preferred embodiment of this invention, a signalling system identifies and monitors a transponder unit which operates to transmit a unique message in response to receipt of a transmitted interrogation signal. An interrogation unit continuously transmits an interrogation signal until a transponder unit responds, and a receiver at the interrogation unit receives the message from a transponder.

The interrogation unit includes a circuit responsive to the reception of the message from a transponder and transmits a verification signal corresponding to the signal train received by the interrogation unit receiver circuit. In the transponder unit, the verification signal is compared with the message signal train supplied from the transponder; and the comparison circuit produces an output upon failure of a verification. In the transponder this output causes the transponder unit to reset and cease transmission of the message. At the interrogation station, the resetting of a transponder (resulting in the failure of data to be received as expected) causes reversion of the interrogation station to an interrogation mode of operation.

In a more specific embodiment, the interrogation station further includes a buffer storage circuit for temporarily storing received messages, with the storage of the messages in the buffer storage circuit being at one bit rate with the removal of messages from the buffer storage circuit for utilization being effected at a different bit rate.

DETAILED DESCRIPTION

Figure 1:
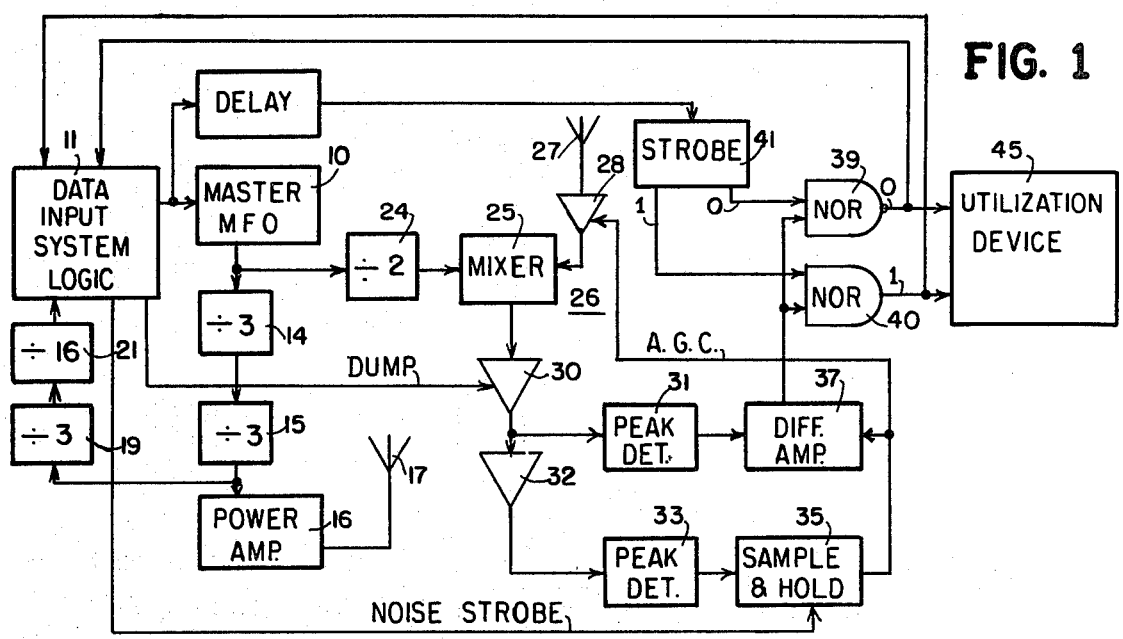
FIG. 1 is a block diagram of an interrogation station.

Referring now to the drawings, there is shown in FIG. 1 a functional block diagram of an interrogation station trackside unit of a type which may be provided at fixed locations to be passed by vehicles to be interrogated. In conjunction with a railway system, the interrogation station could be located along the right-of-way of the trains including cars which are to be monitored. Each of the vehicles to be monitored by the interrogation station shown in FIG. 1 carries a transponder of the type illustrated in FIG. 2.

Figure 2:
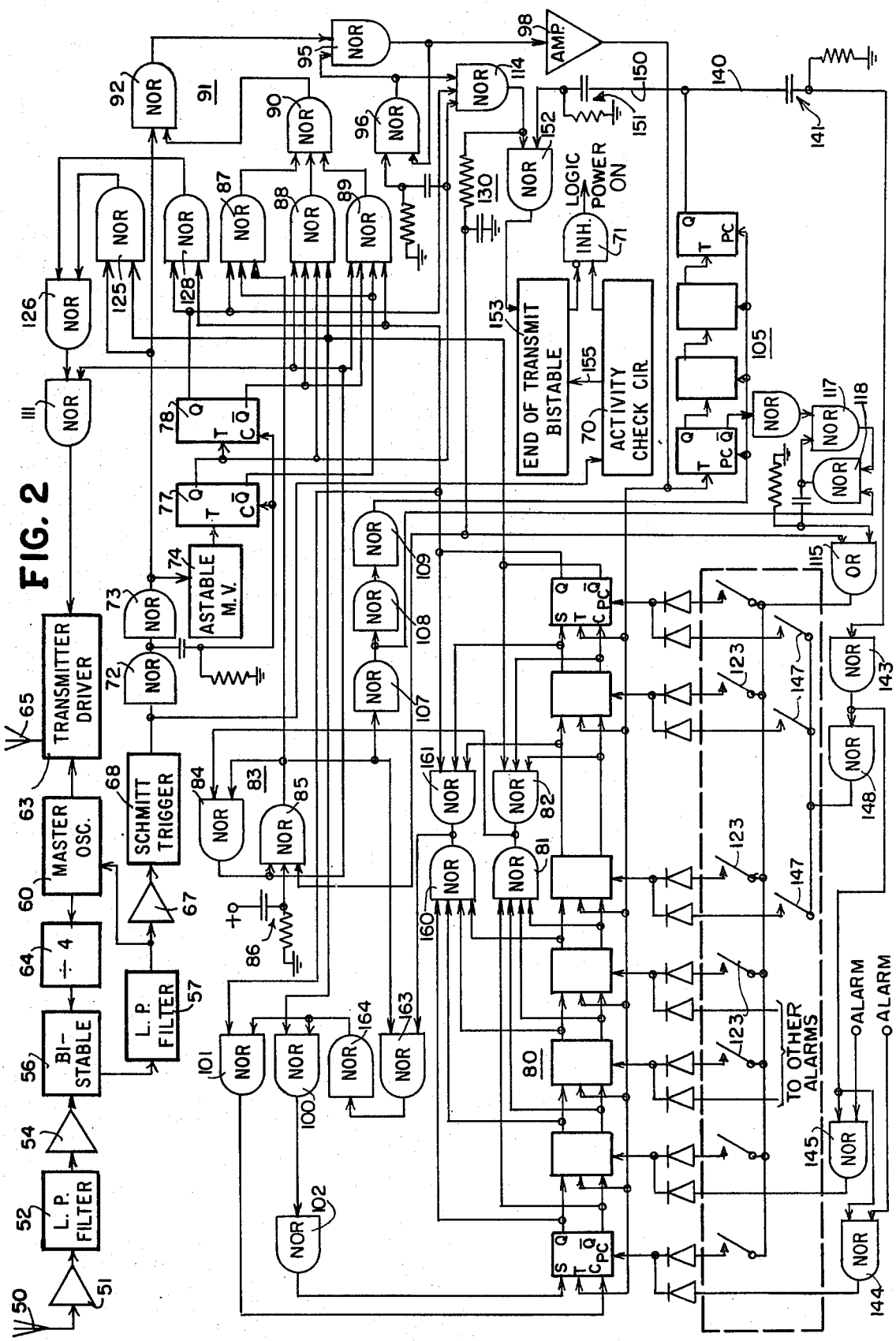
FIG. 2 is a block diagram of a transponder unit for operation in conjunction with the interrogation station shown in FIG. 1.

In the trackside interrogation station, a master frequency oscillator 10 is utilized to provide all of the operating frequencies for the system, including the vehicle transponder illustrated in FIG. 2.

The master frequency oscillator 10 is controlled by data input signals from a data input and system logic circuit 11 which supplies a sequence of two level signals to the master frequency oscillator 10. These signals cause the frequency of the oscillator 10 to shift between two frequencies, so that its output is an FSK output signal. This output is supplied through two divide-by-three circuits 14 and 15 to a power amplifier circuit 16, which supplies the output signals from the interrogation station over a transmitting antenna 17. For the purposes of illustration, the transmitter frequencies supplied from the antenna 17 may be considered 47.25 kilohertz for "mark" information, and 45.75 kilohertz for "space" information, the terms "mark" and "space" being used merely to distinguish the two different states of the output signals.

The output of the frequency divider 15 also is supplied through another divide-by-three frequency divider 19 and a divide-by-16 frequency divider 21 to provide data clock signals to the data input and system logic for operating that logic. Thus, the data input and system logic frequency is controlled directly by the master frequency oscillator 10.

In addition to supplying the FSK signals which are transmitted from the interrogation station, the output of the master frequency oscillator 10 is also supplied through a divide-by-two frequency divider 24 which supplies the injection frequencies to a mixer 25 located in the interrogation station receiver circuit 26. Signals received by the receiver circuit 26 are applied from a receiver antenna 27 to a band pass amplifier 28. The output of the mixer 25 then is supplied through frequency selective amplifying circuit 30 to a first peak detector 31, with the output of the amplifier 30 also being supplied to a further amplifier 32 which provides input signals to a second peak detector 33.

The input signals which are supplied to the antenna 27 and which ultimately determine the magnitude of the signals stored in the peak detectors 31 and 33 are supplied to the antenna 27 from the transponder shown in FIG. 2. The interrogation station shown in FIG. 1 may continuously transmit interrogation code sequences in the form of two level FSK signals in accordance with a predetermined pattern generated by the data input and system logic 11. The particular format of this pattern may vary to suit the particular operating requirements of the system employing the interrogation station and transponder shown in FIGS. 1 and 2, but preferably is in the format shown in waveform A of FIG. 3.

The signals transmitted from the antenna 17 of the interrogation station are received in the transponder on an antenna 50 (FIG. 2) when the vehicle carrying the transponder comes close enough to the interrogation station to receive such signals. These signals are supplied through an RF amplifier state 51 to a low pass filter 52 which has a pass characteristic chosen to prevent signals transmitted by the transponder circuit and received by the antenna 50 from being passed thereby. The output of the filter 52 is applied through an additional amplifier stage 54 to the "set" input of a bistable multivibrator 56, so that a "set" pulse is applied to the input of the multivibrator 56 for each cycle of the received FSK input signals.

Included in the transponder is a variable frequency transponder oscillator 60, the frequency of which is controlled by a DC control voltage applied over a lead 61 to the oscillator 60, with the output frequency of the oscillator 60 selected to be four times the frequency transmitted by the interrogation station. The output of the transponder oscillator 60 is applied to a transmitter driver circuit 63 to provide the source of operating frequency for the transmitter of the transponder. This output also is applied through a divide-by-four frequency divider 64 which supplied output signals or pulses to the "reset" input of the bistable multivibrator 56, thereby resetting the multivibrator 56 each time that a reset pulse is applied thereto following the application of a set pulse to the "set" input from the output of the amplifier 54. It should be noted that the ratio of the frequency of the oscillator 60 to the interrogation station frequency may be other than that selected for purposes of illustration.

In order to derive the oscillator control voltage for the transponder oscillator 60 to phase lock the frequency of operation of the transponder oscillator 60 to the frequency of the received signal obtained from the antenna 50, the output of the multivibrator 56 is applied through a low pass filter 57 to produce a varying DC control level, the magnitude of which is dependent upon relative phase shift of the input signals applied to the "set" and "reset" inputs from the amplifier 54 and the frequency divider 64, respectively.

The output of the low pass filter 57 rapidly changes to a different DC level when the input frequency received on the antenna 50 changes in accordance with the FSK signal being transmitted from the interrogation station antenna 17. This change is DC level is applied over the oscillator control lead 61 to the oscillator 60 to shift the frequency of the transponder oscillator 60 until the frequency of the oscillator 60 is four times the received input frequency. When this condition is reached, the DC output of the low pass filter 57 stabilizes at the particular level established by the transmitted frequency from the interrogation station.

This changing DC level from the low pass filter 57 also is applied through an amplifier 67 to a Schmitt trigger circuit 68, the output of which is a reconstructed two level signal, corresponding to the "mark" and "space" input signals applied to the master frequency oscillator 10 from the data input and system logic 11 in the interrogation station. This reconstructed signal train from the output of the Schmitt trigger circuit 68 is utilized in the transponder circuit to operate the transponder logic system.

Since the transponder unit carried by the vehicle is only required to provide an output when it is within the range of an interrogation station (this range being on the order of only a few hundred feet), it is not necessary that the system logic of the transponder unit be energized continuously. In fact it is desirable that this logic normally is not energized in order to conserve power in the vehicle. As a consequence, the power supplied to the logic portion of the transponder unit normally is off; but when the vehicle carrying the transponder enters into the range of an interrogation station, the output of the Schmitt trigger circuit 68 changes between mark and space signal levels in accordance with the signals being received on the antenna 50 by the transponder. This activity is applied from the Schmitt trigger circuit 68 over a lead 69 to a conventional activity check circuit 70 which provides an output pulse a predetermined time interval after signal activity appears on the lead 69.

This output pulse is passed through a normally enabled inhibit gate 71 to be utilized to effect the turning on of operating power for the system logic shown in FIG. 2. The power supply circuit and the switch energized by the output of the inhibit gate 71 have not been shown in FIG. 2 since these circuit elements are conventional and may be embodied in number of different forms. The activity check circuit 70 prevents accidental turning on of logic operating power due to spurious noise conditions and the like.

Once power has been applied to the logic portion of the circuit shown in FIG. 2, it then responds to the signals obtained from the output of the Schmitt trigger circuit 68. As stated previously, the trackside interrogation station normally transmits a continuous sequence of interrogation pulses. As shown in waveform A of FIG. 3, these pulses are in the form of a 1 millisecond mark pulse followed by a 3 millisecond space pulse, this pattern being continuously repeated. For the purposes of illustration, the mark pulse may be considered to be transmitted at a 47.25 kilohertz rate, with the space pulse being transmitted at a 45.75 kilohertz rate.

At the output of the Schmitt trigger circuit 68, the decoded mark and space pulses are in the form of a "high" output for mark and a "low" output for space and are applied through a pair of inverters 72 and 73 to the clamping input of an astable multivibrator 74, which provides the basic timing reference to decode signals received from the interrogation station. When the output of the Schmitt trigger circuit 68 is a space output, the astable multivibrator 74 is clamped to an "off" condition of operation with the output then being held "high." Reception of the first mark pulse releases the multivibrator 74 for operation to produce a negative going or "high" to "low" pulse transition 0.5 milliseconds following removal of the clamp at its input. The waveform of the multivibrator 74 then becomes positive 1 millisecond after release and negative 1.5 milliseconds after release, etc., as indicated in the waveform shown at the output thereof.

The output signals of the multivibrator 74, are used to drive a two-stage clock counter including a pair of bistable multivibrators 77 and 78, interconnected as a conventional two stage binary counter. These multivibrators 77 and 78 previously have been reset to a clear state of operation by the first positive-going or low-to-high space to mark transition appearing at the output of the Schmitt trigger circuit 68 and applied thereto through the inverter 72 and a second inverter 79 causing the Q outputs of both of the multivibrators 77 and 78 to be low at the start of operation of the circuit and the Q̄ outputs both to be high. The trigger inputs to the multivibrators 77 and 78 respond to negative-going pulse transistions; so that the pulse transition at the output of the astable multivibrator 74, occuring 0.5 milliseconds after release of the multivibrator for operation, causes the bistable multivibrator 77 to change states with its Q̄ output going low and its Q output going high. This change of state of the multivibrator 77, of course, does not affect the multivibrator 78 at this time.

When power initially is applied to the logic circuit of the transponder, a seven stage shift register circuit 80, each stage of which is a J-K flip-flop, assumes a random count determined by the particular parameters of the different bistable stages of the register. It is unimportant to the operation of this system what this count may be, but it will be appreciated that different transponders in different ones of the cars on a train will have the shift registers 80 therein storing randomly different counts upon the application of operating power. This initial count in the register 80 then determines the address to which the particular transponder with which the register 80 is associated will respond to supply data from the transponder to the interrogation station. This is accomplished by providing the binary "1" outputs of all of the seven stages of the shift register 80 to a pair of NOR gates 81 and 82, which together constitute a 7 input NOR gate.

The outputs of the NOR gates 81 and 82 are coupled together to form an initiate transmission output to a transmit bistable multivibrator 83 in the form of a pair of cross-coupled NOR gates 84 and 85, with the NOR gate 84 providing a high output initially and the NOR gate 85 providing a low initial output. This state of the bistable multivibrator 83 is insured upon the initial application of operating power to the system by coupling one of the inputs of the NOR gate 85 to the operating potential through a capacitor 86, with the junction of the NOR gate input 85 and the capacitor 86 being coupled through a resistor to ground. Thus, when operating potential is initially applied to the logic circuit, a positive pulse is applied to the NOR gate 85, driving its output low. This output combines with the low output obtained from the NOR gates 81 and 82 at the input of the NOR gate 84 to drive the output of the NOR gate 84 high to establish the initial state of operation of the transmit bistable multivibrator 83.

Three timing NOR gates 87, 88 and 89 are provided for controlling the operation of the transponder circuit, and the initial high output of the NOR gate 84 is applied to the NOR gates 88 and 89 to disable these gates, causing the outputs to be held low. At the same time, the output of the NOR gate 85 is low and is applied to the input of the NOR gate 87, enabling the NOR gate 87 to operate to monitor the received interrogation signals. The output of the gate 87 initially is low, however, since one of the inputs to the gate 87 is the Q̄ output of the multivibrator 77. A third input to the NOR gate 87 is obtained from the Q output of the multivibrator 78, which at this time also is a low or enabling input.

When the multivibrator 77 changes state 0.5 milliseconds after receipt of a mark input signal, the Q̄ output thereof goes low, causing a high output to be obtained from the NOR gate 87. This in turn applied to a NOT gate 90 of a code monitor circuit 91, including a second NOR gate 92, causes the NOR gate 90 to produce a low output, thereby enabling the NOR gate 92, the other input to which is obtained from the now-high output of the inverter 73. At 0.5 milliseconds, the high Q output from the multivibrator 77 is applied through a differentiating circuit 97 to the NOR gate 96 to cause the output of a NOR gate 96 to be driven low and that of a NOR gate 95 forming a multivibrator therewith to be driven high.

Upon termination of the mark portion of the interrogation pulse at 1.0 milliseconds, when the output of the inverter 73 goes low, a high output is obtained from the NOR gate 92. This output is applied to one input of the NOR gate 95, to cause the output of the NOR gate 95 to drop from a high to a low value. The high-to-low transition at the output of the NOR gate 95 is applied through an amplifier 98 which produces a high-to-low trigger pulse at its output, with this trigger pulse being applied as a shift pulse to the seven stages of the shift register 80 to shift the information stored in the register one stage to the right, as viewed in FIG. 2.

The output of the final stage of the shift register 80 is such that the Q̄ output is low for a binary "1" stored in that stage and the Q output is low for a binary "0" stored in the final stage. These outputs are connected, respectively, to the inputs of a pair of NOR gates 100 and 101 enabled by the output of the NOR gate 85 through an OR gate formed from two NOR gates 163 and 164, to cause the output of the NOR gate 101 to be high when the final or output stage of the shift register 80 is storing a binary "0" and to cause the output of the NOR gate 100 to become high whenever the final stage of the shift register 80 is storing a binary "1." The output of the NOR gate 101 is coupled to the C input of the input stage of the shift register 80 and the output of the NOR gate 100 is inverted by a NOR gate inverter 102 and is coupled to the S input of the input stage. These connections cause the shift register 80 to operate as a maximum sequence counter, with the input stage changing state upon application of a shift pulse to the register when the potentials applied to the S and C inputs both are low (binary "1" stored in the final stage) and with the input stage not changing state when the S and C inputs both are high (binary "0" stored in the output stage).

The shift pulses which are obtained from the output of the amplifier 98 also are applied to the input of a four stage binary counter 105 to drive the counter 105. At this point in the operation of the circuit, however, the counter 105 is not stepped since the low output of the NOR gate 85 in the transmit bistable multivibrator 83 is applied through three NOR gate inverter stages 107, 108 and 109 to cause a high potential to be applied to the reset or clear inputs of all of the stages of the counter 105, holding the counter 105 in its cleared or "0" state of operation.

Upon termination of the mark portion of the first interrogation pulse in the sequence of interrogation pulses, the potential at the output of the inverter 73 once again becomes low, clamping the output of the astable multivibrator 74 to a high output and terminating operation of the counter stages 77 and 78. At the same time, the NOR gate 92 is enabled and causes a high output to appear. This output is applied to the NOR gate 95 in the bistable multivibrator to cause the output thereof to go low and the output of the NOR gate 96 in the bistable multivibrator to go high with the output transition from the NOR gate 95 forming the next shift pulse. When the next mark appears in the decoded output of the Schmitt trigger circuit 68, the multivibrators is 77 and 78 are cleared, as described previously; and the sequence of operation repeats, until the counter/shift register 80 stores all binary "1's". In this state of the register 80 all of the inputs to the NOR gates 81 and 82 are low, causing a high input to be applied to the NOR gate 84 in the transmit bistable multivibrator 83. The count required to reach this state of operation depends on the initial count stored in the register and may be from one to 127. Whenever the count is reached however, a change of state of the bistable multivibrator 83 is forced, with the output of the NOR gate 84 going low and the output of the NOR gate 85 going high.

With the output of the NOR gate 84 being low, the code verification gates 88 and 89 are enabled as is a transmitter key NOR gate 111. At the same time, the interrogation NOR gate 87 is disabled by the high output applied thereto from the output of the NOR gate 85, causing the output of the NOR gate 87 to be held low as an enabling input to the NOR gate 90.

Figure 3:
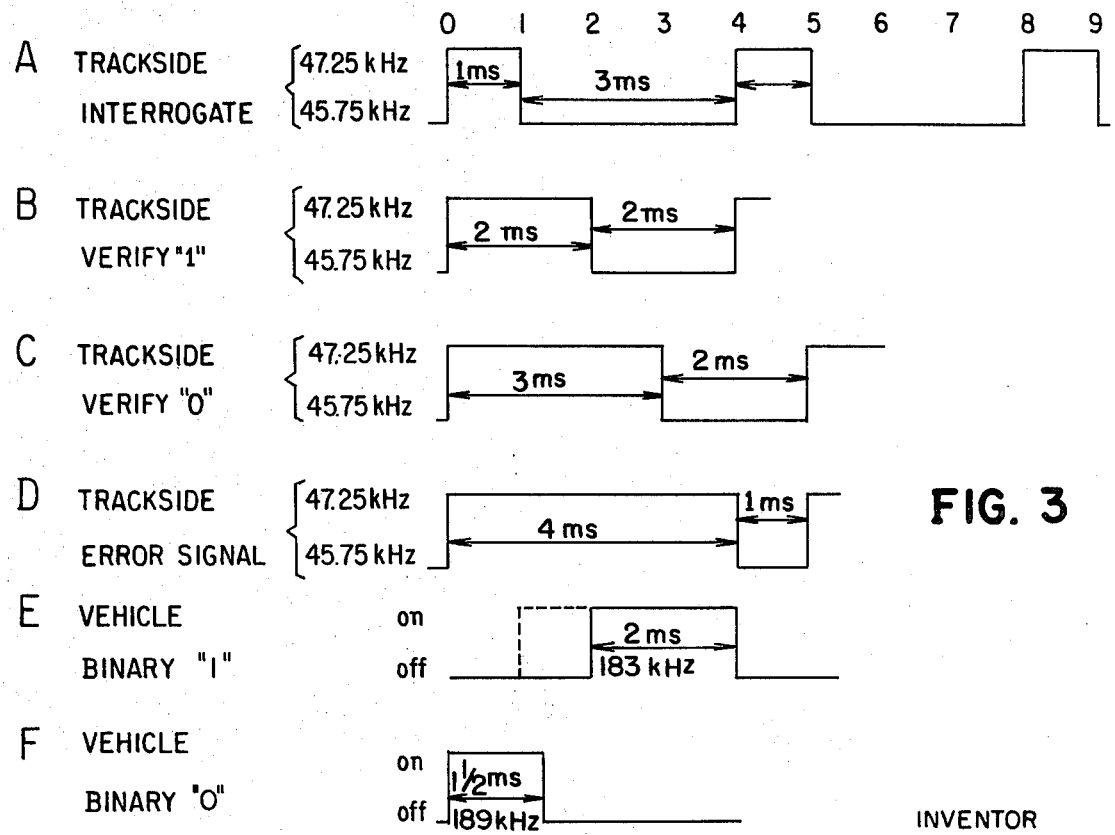
FIG. 3 illustrates the different signals transmitted by the interrogation station shown in FIG. 1 and the transponder unit shown in FIG. 2.

Upon termination of the mark portion of the interrogation pulse, a NOR gate 125 is supplied with the "1" output of the output stage of the shift register 80, which now is low, and supplied with the output of the inverter 73 which is low for the space pulse portion of the interrogation pulse as shown in waveform A of FIG. 3. Thus, the gate 125 provides a high output and this output coupled to the input of a NOR gate 126 produces a low output from the NOR gate 126, which is inverted by the now enabled NOR gate 111 to produce a high transmitter key pulse to the transmitter driver 63. This opens the driver 63 to provide a burst of output signals on the output antenna 65 at a frequency of 183 KHZ; and this signal burst transmitted during the interrogation station "space" pulse, corresponds to a transmitted binary "1" from the transponder unit and persists so long as both of the inputs of the NOR gate 125 are low. This transmitted binary "1" from the transponder is shown in waveform E of FIG. 3, with the dotted line portion of waveform E indicating that this first binary "1" transmitted by the transponder is 3 milliseconds in duration corresponding to the space interval of the interrogation pulse shown in waveform A of FIG. 3. Thus, it may be seen that the first binary data bit transmitted by the transponder always is a binary "1."

At the end of the 3 millisecond space portion of the interrogation pulse, the interrogation station once again commences transmitting a mark pulse which causes the NOR gate 125 to be disabled, producing a low output from the NOR gate 111 and terminating the keying of the transmitter driver 65 to end the first mark pulse transmitted from the transponder. This next mark pulse, for normal operation of the system is of 2 milliseconds duration, followed by a 2 millisecond space pulse to form the "verify 1" verification signal to indicate to the transponder that the first data bit received by the interrogation station was a binary "1". The verify "1" signal is shown in waveform B of FIG. 3.

At the time that the NOR gate 85 is driven to produce a high output, the output of the NOR gate 109 drops to a low output thereby enabling the four stage binary counter 105 for operation.

Upon the application of the first high-to-low output transition from the astable multivibrator 74 to the trigger input of the bistable multivibrator 77 0.5 milliseconds after the beginning of the verify "1" mark pulse, a low-to-high trigger pulse is applied from the Q output of the multivibrator 77 through the differentiating circuit 97 to the NOR gate 96 to drive the NOR gate 96 output low. This in turn causes the output of the enabled NOR gate 95 to become high, thereby resetting the flip-flop 95, 96.

Verification of the transmitted binary data from the transponder takes place in conjunction with the operation of the verification NOR gates 88 and 89, with the binary "1" stored in the final stage of the shift register 80 at this time enabling the NOR gate 88. A binary "0" stored in the final stage of the shift register 80 enables the NOR gate 89. As stated previously, both of these gates also are supplied with a low enabling potential from the output of the NOR gate 84 in the transmit bistable multivibrator 83. Selected outputs from the counter 77, 78 are applied to inputs of the NOR gates 88 and 89 to cause the inputs from the counter to be low during the time periods of 1.5 to 2.5 milliseconds for the NOR gate 88, and 2.5 to 3.5 milliseconds for the NOR gate 89, respectively.

Thus, in the case of the binary "1" which has been transmitted in the above example, the NOR gate 88 is provided with low input signals to all of its inputs when the count of the counter 77, 78 reaches 1.5 milliseconds and this condition lasts until 2.5 milliseconds after the start of the mark pulse interval if not terminated sooner. As a result, a high output is obtained from the NOR gate 88, forcing the output of the NOR gate 90 to become low thereby enabling the NOR gate 92 during the 1.5 to 2.5 millisecond "window." If the received verification signal is a verify "1", the mark output of the inverter 73 terminates at 2 milliseconds, which is during this window when the NOR gate 88 provides a positive output. Termination of the received mark pulse causes a low output to be obtained from the inverter 73 and this low output applied to the other input of the NOR gate 92 forces its output to go high, resetting the bistable multivibrator consisting of the NOR gates 95 and 96, with the output of the NOR gate 96 going high and the output of the gate 95 going low to produce the next shift pulse from the amplifier 98.

This shift pulse obtained from the output of the amplifier 98 also is applied to the input of the counter 105 to step the counter 105 from a count of 0 to a count of 1, since the counter was released for operation when the output of the NOR gate 85 became high to place the transponder in the transmit mode of operation. Stepping the counter 105 to a count of 1 causes the Q output of the first stage of the counter to become low. This output is inverted and applied to one of the two inputs of a NOR gate 117, forming one half of a bistable multivibrator with a second NOR gate 118, to force the output of the NOR gate 117 to go low. Combining this low output with the low enabling input applied to the second input of the NOR gate 118 from the now low output of the inverter 107 produces a low-to-high pulse transition at the output of the NOR gate 118. This transition is applied through a differentiating circuit 120 and an OR gate 115 to the clear inputs of selected ones of the seven stages of the shift register 80, as determined by the settings of a plurality of programmable switches 123.

The switches 123 may be variably set to store a unique address identifying the vehicle with which the transponder is associated. Since all of the stages of the shift register previously stored a binary "1," the clearing of selected ones of these stages permits any desired pattern of binary signals to be stored in the register. The signals applied to the clear inputs of the stages of the register associated with closed switches 123 override the affect of the shift pulse applied to the register 80.

With this operation, the second through eighth binary data bits of the transponder message are stored in the register 80, with the second data bit being present in the output stage.

Figure 4:
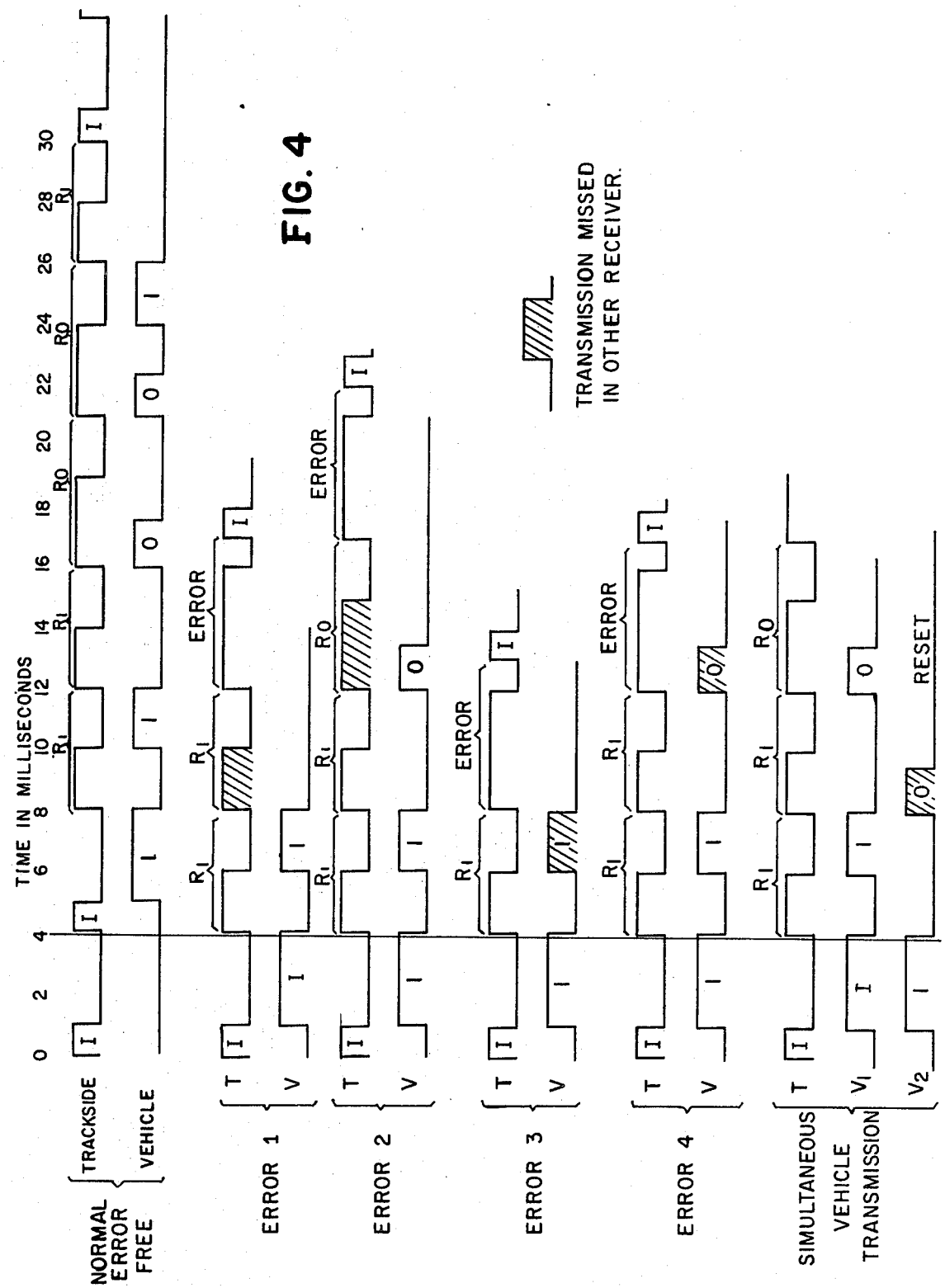
FIG. 4 shows typical message sequences for different modes of operation of the circuits shown in FIGS. 1 and 2.

If the second transponder data bit also is a binary "1," as indicated in the "error free" waveform sequence in FIG. 4, the foregoing sequence for the transmission and verification of the binary "1" is repeated. The duration of the transmitted burst from the transponder is 2 milliseconds, however, transmitted during the space interval of the first "verify 1" sequence from the trackside interrogation station, as shown in solid lines in waveform E of FIG. 3.

If the next data bit of information shifted into the output stage of the shift register 80 is a space data bit, no longer are enabling signals applied to the NOR gates 88 and 125; but the Q output (binary "0") of the final stage of the shift register 80 does enable the binary "0" checking gate 89 and the transmit "0" timing NOR gate 127. The NOR gate 127 provides a low output at this time however, because the Q output of the bistable multivibrator 78 is high due to the fact that the signal transition causing the shift of information occured at 2 milliseconds which is after the 1.5 millisecond time interval at which the Q output of multivibrator 78 went high. As a result, both inputs to the NOR gate 126 are low, causing a high output to be obtained therefrom, forcing the output of the NOR gate 111 to be low. Thus, no output is obtained from the transmitter driver 63 during the space pulse portion of the second verify "1" signal.

By referring to FIG. 3 it may be seen that the verification signals transmitted by the interrogation station each commence with a mark pulse interval which is at least 2 milliseconds long (as in the case of the verified "1" signal shown in waveform B). Thus, immediately following the end of the space pulse portion of the second verify "1" signal sequence, the interrogation station commences transmitting a mark pulse, tentatively indicating a verify "0" signal. As a consequence, the output of the transmit 0 timing NOR gate 127 is high for 1.5 milliseconds, causing a low output to be obtained from the NOR gate 126, which is inverted by the NOR gate 111 to a positive keying pulse applied to the transmitter driver 63 to cause the transmission of a signal burst from the antenna 65. Since the signal burst is transmitted during a received mark interval, it is at a frequency of 189 kilohertz; and this transmitted binary "0" from the vehicle transponder is illustrated in waveform F of FIG. 3. The signal burst is terminated at 1.5 milliseconds when the Q output of the bistable multivibrator 78 becomes high. Thus, the transmission of a binary "0" from the transponder always occurs during the mark pulse interval of the verify signal.

In the logic of the trackside or interrogation station receiver, the received "0" data bit is identified and causes a transmission of a verify "0" signal back to the transponder unit. This signal has a 3 millisecond mark pulse followed by a 2 millisecond space pulse and is indicated in waveform C of FIG. 3 and also is shown in the error free waveforms of FIG. 4. During the period between 2.5 and 3.5 milliseconds, the NOR gate 89 provides a high output, forcing the output of the monitor NOR gate 90 to be low thereby enabling the NOR gate 92 to check the received verification signal applied to the other input thereof. For a verify "0" signal, the mark-to-space transition occurs at 3 milliseconds which is within the gating window provided by the output of the NOR gate 89. If a mark-to-space transition occurs at this time, the NOR gate 92 produces a high output to trigger or reset the bistable multivibrator 95, 96 to produce the next shift pulse to the shift register 80 and to advance the counter 105. This transmission and verification operation continues for the duration of the transponder message, the length of which may be arbitrarily determined in accordance with the requirements of the particular system with which the transponder and interrogation station are used.

The high output from the NOR gate 85 during the transmit mode of operation of the transponder is applied to one of the inputs of a NOR gate 163 to produce a low output which is inverted by a NOR gate inverter 164 to produce a high input to each of the NOR gates 100 and 101, forcing the outputs of these gates to go low. The inverter 102 causes a high input to be applied to the "S" input of the input stage of the shift register 80 to force the shift register 80 to be filled with binary "1's".

In the transponder unit shown in FIG. 2, a 16 bit message is transmitted; and when the counter 105 reaches a count of 8, a low-to-high pulse transition is applied over a lead 140 to a differentiating circuit 141. The differentiated positive pulse is applied to a first inverter 143 which supplies a negative pulse to a pair of alarm NOR gates 144 and 145 the other inputs to which may be provided for monitoring alarm conditions such as high or low temperature conditions in a refrigerator car or the like. The output of the NOR gates 144 and 145 will depend upon the alarm condition, clearing the corresponding stage of the shift register 80 coupled with the output of the NOR gate to a "0" state if the alarm condition is present, or leaving the corresponding stage of the shift register 80 set to a "1" state if the alarm condition does not exist.

As illustrated in FIG. 2, the last three stages of the shift register 80 are provided with variable information in accordance with the settings of three switches 147 which may be utilized to complete the identification code of the vehicle, the first eight bits of which were established by the settings of the switches 123 and the binary one input corresponding to the first address information bit required by this system. To produce the desired positive pulse applied to the switches 147, the output of the NOR gate inverter 143 is again inverted by a NOR gate inverter 148.

The foregoing operation of transmitting binary "1" or binary "0" in accordance with the information stored in the shift register 80 continues for the next 7 data bits of information stored in the register 80. When the binary counter 105 reaches a count of 15, the binary "1" loaded into the in-put stage with the first shift pulse following the second loading of the register reaches the output stage of the shift register 80 and constitutes the final or 16th data bit of the message. Other system formats could be employed which would not require the binary "1" prefix and suffix.

When the counter 105 reaches a count of 16 a high-to-low pulse transition appears on a lead 150 coupled to the output stage of the counter 105, and is differentiated in a differentiating circuit 151 and applied to a NOR gate 152, which normally is enabled by the low output of the activity error NOR gate 114. This then causes a positive output pulse to be applied from the NOR gate 152 to an end of transmission bistable multivibrator 153, which is set to produce a positive inhibit output applied to the inhibit gate 71, blocking the output of the activity check circuit 70 and turning off the operating power to the logic circuit shown in FIG. 2. This then prevents a second transmission of a successfully transmitted message from the transponder circuit. When the transponder is moved out of the range of the interrogation station, the activity check circuit output drops and results in an "activity off" pulse supplied over a lead 155 to the end-of-transmit bistable multivibrator 153, resetting the bistable multivibrator to again enable the inhibit gate 71. Thus, the next time the transponder is moved within range of a interrogation station the foregoing sequence of operation may be repeated.

If at any time during transmission of the message, verification of a "1" pulse does not occur (error 1 of FIG. 4), a mark is present at the output of the inverter 73 for a period of greater than 2 milliseconds, permitting the stage 77 of the clock counter to be reset at 2.5 milliseconds, thereby disabling the NOR gate 88 and preventing a reset pulse from appearing at the output of the NOR gate 92. For example, reference to waveforms C and D of FIG. 3 shows that a trackside interrogation station verify "0" signal includes a 3 millisecond mark pulse interval. Failure to receive any signal from the interrogation station appears as a mark pulse interval of indefinite length. Occurence of any of these mark pulse intervals following the transmission of a binary "1" from the transponder prevents proper verification and indicates a received error. Similarly, a verify "0" error occurs if the mark pulse interval in the verify signal is less than 2.5 milliseconds, or greater than 3.5 milliseconds, the "window" of gate 89.

In either such event, the output of the NOR gate 96 in the activity bistable multivibrator remains low, enabling the activity error NOR gate 114. As a consequence, the next time that the bistable multivibrators 77 and 78 in the clock counter are cleared, both of the other inputs to the NOR gate 114 become low, resulting in the output thereof going high. This output is applied through an integrating circuit 130 to the input of the NOR gate 85 in the transmit bistable multivibrator 83.

The transmit bistable multivibrator 83 then is reset to its initial condition of operation, with the output of the NOR gate 85 being low and the output of the NOR gate 84 being high. This then terminates transmission from the transponder and the initial mode of operation in response to received interrogation pulses occurs. It should be noted that during this mode of operation, the NOR gates 88 and 89 are disabled, as described previously, with only the interrogation monitoring NOR gate 87 being enabled. As a consequence, reception of verify "1" and verify "0" signal sequences of the type illustrated in waveforms B and C of FIG. 3 has no affect on the circuit, since the gate 87 causes shifting or stepping, of the register 80 in response only to properly received interrogation pulses.

Upon receipt of such interrogation pulses, the register 80 continues to be stepped as a maximum sequence counter from the count it attained prior to the time the error was detected. It should be noted that this count is not necessarily the same as the count which originally was stored in the register 80 to create the address for the vehicle transponder. This is of no consequence, however, since a random address code merely is utilized to prevent all of the vehicles from simultaneously attempting to respond and since the transponder messages uniquely identify the vehicles from which they are sent.

Due to the fact that the initial "address" for the vehicle is established by the random states attained by the different stages of the register 80 upon the application of operating potential thereto, it is possible for all of the stages of the register 80 to assume a "0" state. This condition will prevent the register from operating as a maximum sequence counter, so that it is desirable to recognize this condition and force the storage of a "1" in the input stage of the register 80 upon the application of the first shift pulse. This is accomplished by a pair of NOR gates 160 and 161 coupled to the "0" or Q outputs of all the stages of the shift register 80 to produce a high output only if all of the stages of the register 80 simultaneously store a "0." This high output is applied through the NOR gate 163 to produce a low output which is inverted by the NOR gate inverter 164 to produce a high input to each of the NOR gates 100 and 101, forcing the outputs of these gates to go low. The inverter 102 coupled to the output of the NOR gate 100 causes a high input to be applied to the "S" input of the input stage of the shift register 80, as described previously. The first shift pulse applied to the register 80, then causes the storage of this "1" pulse, at which time the output of the NOR gate 163 goes high under the control of the output of the NOR gate 85 in the transmit bistable multivibrator 83.

Referring again to FIG. 1, the transmitted bursts of signals supplied by the transponder unit of FIG. 2 are received on the antenna 27 of the receiver circuit 26 in the interrogation station as described previously. A relatively narrow bandwidth circuit may be employed in the receiver 26, since the injection and input frequencies vary together, both under the control of the same master frequency oscillator 10 located in the interrogation station.

In view of the fact that the signals transmitted from the transponder antenna 65 are in the form of bursts of transmitted frequency followed by an off or no transmission condition of the transponder unit, it is desirable to compare the signal level of the signals received by the receiver unit 26 during the transmission of the bursts of signals from the transponder with a signal level which exists in the presence of noise and in the absence of signals being transmitted by the transponder circuit. To accomplish this, the output of the mixer circuit 25 is applied through two amplifier circuits 30 and 32 with the output of the amplifier circuit being applied to the peak detector 31, as described previously, and with the output of the amplifier 32 being applied to a peak detector 33, which in turn provides an output signal to a sample and hold circuit which may be of any suitable configuration. At predetermined time intervals, established by the signal pattern, a pulse is applied from the output of the data input and system logic circuit 11 to the sample and hold circuit 35 to cause it to be gated to store the signal level present at the output of the peak detector 33 at that time. The timing of this gating pulse may be established in conjunction with the timing provided by the data clock to the data input and system logic 11 to occur at a time in the signal format when the output of the transponder is known to be off between transmission of bursts of signals from the transponder. The output of the sample and hold circuit 35 then established a DC reference level for a differential amplifier comparison circuit 37 and is applied to the reference input of the differential amplifier 37. This output also may be used as an AGC signal to control the gain of the input amplifier 28.

When a signal is transmitted from the antenna 65 of the transponder and is received by the receiver 26, the signal level thereof is applied by the peak detector 31 to the differential amplifier circuit 37 where it is compared with the reference level provided by the circuit 35. If a signal burst is present, the output of the differential amplifier changes from a normally high output to a low output to enable a pair of NOR gates 39 and 40 which are utilized to decode the "0" and "1" received information, respectively.

To generate verification patterns, the signal transitions in the data input and system logic signal applied to the input of the master frequency oscillator 10 to shift the frequency thereof are detected in a strobe circuit 41, with the signal transition signifying the beginning of a transmitted mark interval being applied to the "0" output of the strobe circuit 41 in the form of a negative-going pulse during the first 1.5 milliseconds of "mark" transmission. This pulse applied to the NOR gate 39 produces a positive-going output, signifying a received "0" if the NOR gate 39 is enabled by the output of the differential amplifier 37 at the time the "0" strobe occurs. As stated previously, a "0" pulse transmitted from the transponder always is transmitted during the beginning of the transmission of a "mark" pulse from the interrogation station; so that strobing the gate 39 at this time provides an indication as to whether or not a "0" is being transmitted by the transponder.

The strobe circuit 41 also provides a delayed "1" strobe pulse in response to a signal transition applied to the input of the master frequency oscillator 10 signifying a mark-to-space transition in the interrogation station transmitted signal. The NOR gate 40 then is strobed in the same manner as the NOR gate 39 but during the transmission of "space" from the interrogation station. If a "1" is being received at the same time (since transponder "1's" are transmitted during a received space in the transponder), the output of the NOR gate 40 is a positive pulse upon the application of the strobe "1" pulse from the circuit 41.

The received pulse sequence, as determined by the outputs of the NOR gates 39 and 40, may be supplied to a suitable utilization device 45, such as a printer, cathode ray tube display, or the like. The same signals obtained from the outputs of the NOR gates 39 and 40 are applied to the data input system logic 11 to control the transmitted pattern of the frequency shifts of the frequency of the master oscillator 10 for forming the verification signal patterns.

Figure 5:
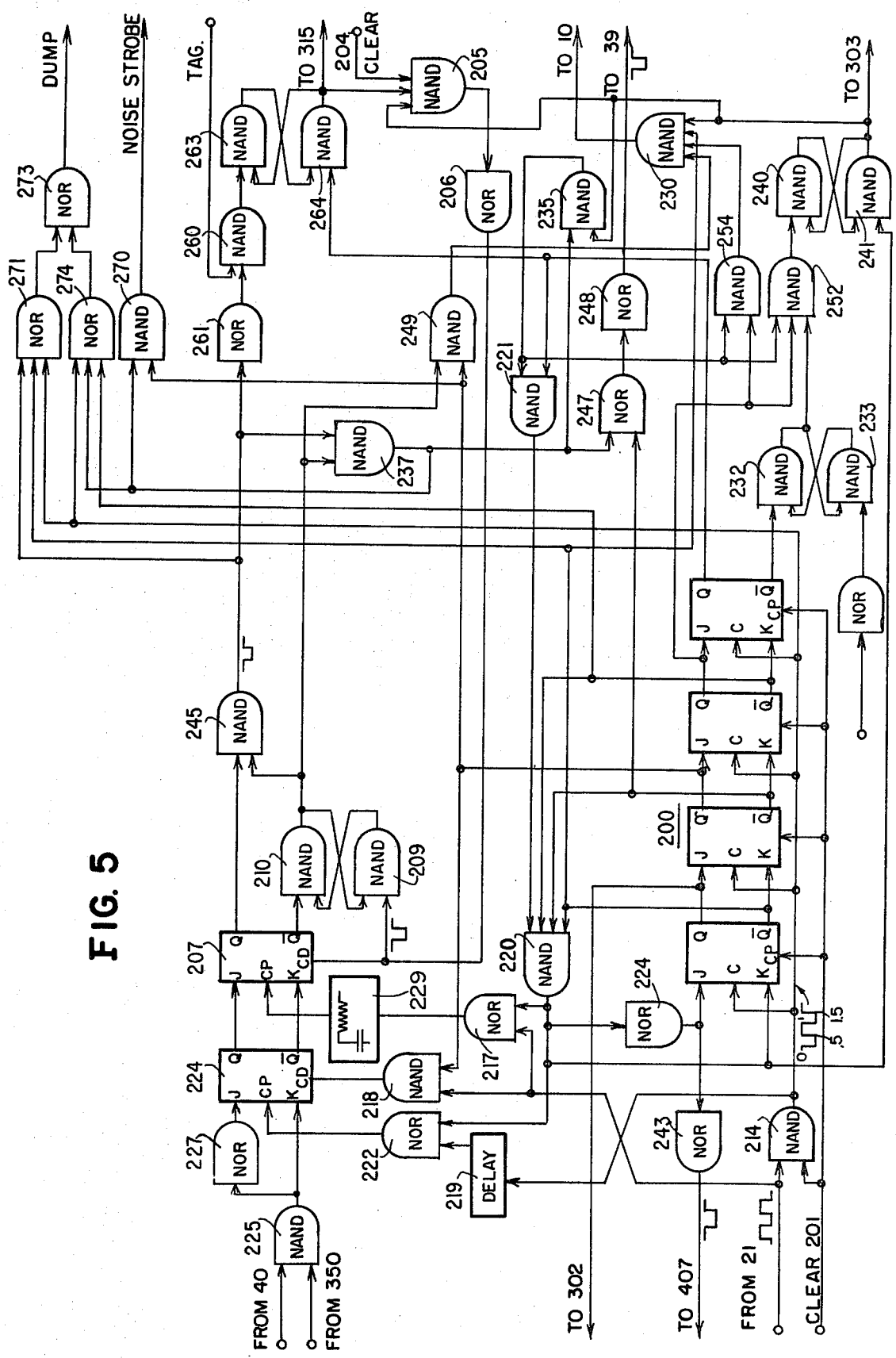
FIG. 5 is a detailed block diagram of the system logic portion of the circuit shown in FIG. 1.
Figure 6:
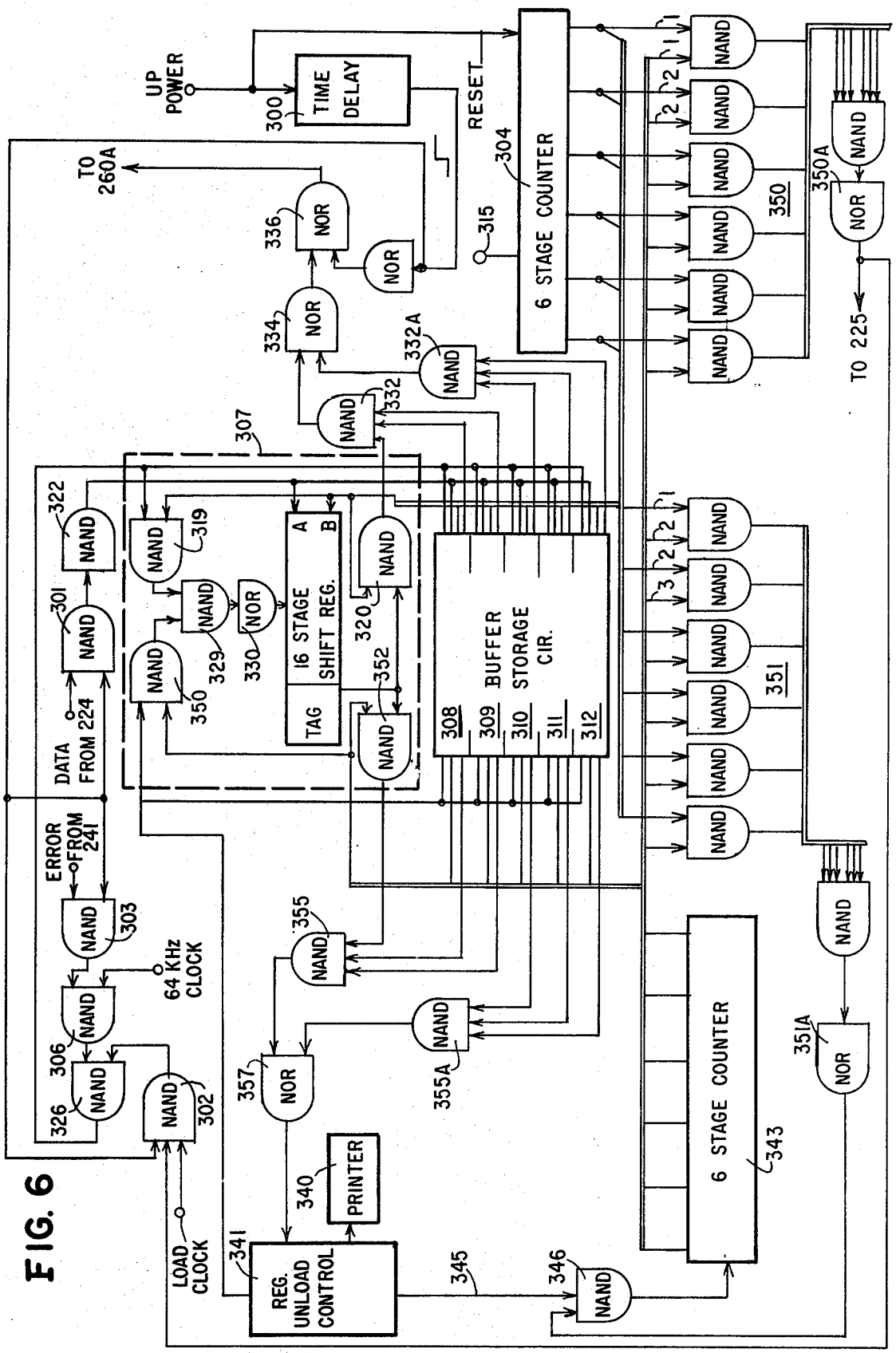
FIG. 6 is a block diagram illustrating a buffer storage circuit for use in conjunction with the circuits shown in FIGS. 1 and 5.

Refer now to FIGS. 5 and 6, which show the details of the data input and system logic 11 and the utilization device 45 shown in FIG. 1, for a more complete understanding of the operation of the interrogation station.

The normal mode of operation for the interrogation station in the absence of any reply from a transponder is for the interrogation station to continuously transmit the sequence of interrogation pulses illustrated in waveform A of FIG. 3. In the interrogation station logic circuit shown in FIG. 5, the basic timing for the operation of the interrogation station to produce the different output waveforms illustrated in waveforms A, B, C, and D of FIG. 3 is controlled by a four stage shift register 200, operated as a timing control circuit. When power is first applied to the interrogation station logic or following a manual clear operation, a low clear pulse is applied to a terminal 201 and to the clear trigger inputs of all of the stages of the register 200 to clear the register, causing the Q outputs thereof to become low and the $\bar{Q}$ outputs to become high. This same clear pulse also is shown in FIG. 5 as being applied to a terminal 204, located at the right hand side of the drawing, and is applied to a clear control NAND gate 205 forcing the output of the NAND gate 205 to become high. This output is inverted by a NOR gate inverter 206 to apply a low clearing pulse to a bistable multivibrator 207, causing the Q output of the miltivibrator 207 to go low and the $\bar{Q}$ output thereof to go high. At the same time, the low clear pulse from the inverter 206 is applied to one of the inputs of a NAND gate 209, forming a received message bistable multivibrator with a second NAND gate 210, causing the output of the NAND gate 209 to go high. The output of the NAND gate 210 is held low since both inputs to it, from the $\bar{Q}$ output of multivibrator 207 and the output of NAND gate 209 are high. This is the reset condition of the multivibrator 209, 210 awaiting reception of a message from a transponder.

The clear pulse supplied to the terminals 201 and 204 is of relatively short duration and establishes the initial or starting condition of operation of the interrogation station. Upon termination of this pulse, the potential on the terminals 201 and 204 rises to a high potential, enabling the NAND gate 205 and enabling the NAND gate 214, the other input to which is obtained from the counter 21 (FIG. 1) providing the clock pulses used to coordinate the operation of the interrogation station with the master frequency oscillator 10. The clock pulses applied to the terminal 21 occur at approximately a one kilohertz rate and appear as substantially a square wave signal indicated in waveform 215. These pulses are applied directly to a timing NOR gate 217 and a timing NAND gate 218 and are inverted by the NAND gate 214 and applied as short pulses to the register 200 and as clock pulses to a NOR gate 222. When the second stage of the shift register counter 200 is cleared, the Q output thereof goes low and forces the output of the NAND gate 218 to be held high until a binary "1" is stored in the second stage of the counter 200.

Upon the initial clearing of the register counter 200, causing the $\bar{Q}$ outputs to become high and the Q outputs to become low, the three inputs supplied to a NAND gate 220 from the $\bar{Q}$ outputs of the first three stages of the register all are high, as is an input applied thereto from a NAND gate 221, one of the inputs of which is the Q output of the final stage of the register 200 forcing the output of the gate 221 to be high. This coincidence of four high inputs to the NAND gate 220 causes its output to be low at the start of operation of the circuit, thereby enabling the NOR gates 217 and 222 for the passage of clock pulses applied thereto. At the same time, the output of the NAND gate 220 is inverted by a single input NOR gate 224, the output of which is applied to the "1" input of the first stage of the shift register 200 to cause the insertion of a "1" timing signal into the register upon receipt of the first high-to-low trigger pulse or shift pulse by the register 200.

For the purposes of illustration, assume that power is applied to the circuit shown in FIG. 5 and that the clear pulse has terminated just prior to the To time interval of the clock pulse sequence 215 obtained from the counter 21. As a consequence, when the initial low to high pulse transition occurs, the output of the NAND gate 214 drops from high to low to provide a negative trigger or shift pulse to the stages of the shift register 200, causing the storage of the "1" timing bit in the first stage of the register 200. This then produces a high output from the Q output of the first stage of the register 200.

At the same time, the output of the NAND gate 220 becomes high, due to the removal of the enabling input obtained from the $\bar{Q}$ output of the first stage of the counter register 200. This high output then forces the output of the NOR gate 217 to be driven low and causes the outputs of both NOR gates 217 and 222 to be held low so long as the output of the NAND gate 220 remains high. The output of the NOR gate 222 previously has been driven low by the output of the NAND gate 214, delayed by a delay circuit 219 which causes a loading or trigger pulse to be supplied to a received data multivibrator 224. This first low output pulse from the NOR gate 222 operates as a trigger pulse on a received data multivibrator 224 the inputs to which are the normal and inverted output of a control NAND gate 225, one input to which is obtained from the output of the NOR gate 40 (FIG. 1) and the other input to which is a normally high input obtained from a storage overflow gate to be described subsequently. At this time, the output from the NOR gate 40 is low since it has been assumed that no data is being received from a transponder unit. Thus, the output of the NAND gate 225 is high, being inverted and applied to the binary "1" input of the bistable multivibrator 224 by an inverted NOR gate 227, and being applied directly to the "0" input; so that upon receipt of the trigger pulse from the NOR gate 222, the multivibrator 224 stores a "0" condition causing the $\bar{Q}$ output to remain high and a Q output to remain low.

Shortly thereafter, the negative going or high-to-low pulse transition at the output of the NOR gate 217 is applied through a differentiating circuit 229 to the trigger input of the bistable multivibrator 207 the signal inputs to which are obtained from the Q and $\bar{Q}$ outputs of the multivibrator 224. Due to the fact that the $\bar{Q}$ outputs of the multivibrator 224 is high at this time, this first trigger pulse supplied to the multivibrator 207 does not change its state.

At time 0 of the clock signal 215 when the $\bar{Q}$ output of the first stage of the register counter 200 goes low, this output is applied to one of four inputs of an output transmitter control NAND gate 230, forcing the output of the NAND gate 230 to go high. This output is applied as the frequency control signal to the master frequency oscillator 10 (FIG. 1) causing the frequency of the master frequency oscillator 10 to be shifted to the "mark" output frequency. This condition of operation is always attained whenever the output of the NAND gate 230 is high, and a high output is obtained from the NAND gate 230 any time any one of the inputs thereto is low. Thus for the time interval from 0 to 1 millisecond, when the next high-to-low trigger pulse is applied to the register counter 200 the output of the NAND gate 230 is high. At 1 millisecond a "0" is stored in the first stage of the counter register 200 due to the high output of the NAND gate 220 applied to the 0 priming input of the first stage of the register. This causes the $\bar{Q}$ output of the first stage once again to go high so that output of the NAND gate 230 once again becomes low, since all of the inputs applied thereto are high. This first 1 millisecond high output applied to the transmitter master frequency oscillator 10 constitutes the one millisecond "mark" pulse at the beginning of an interrogation pulse sequence or cycle as shown in waveform A of FIG. 3. When the output of the NAND gate 230 is low, the oscillator 10 transmits at a lower frequency corresponding to the space portion of the sequence.

When the clock pulse at the output of the NAND gate 214 occurs at 3 milliseconds, the binary "1" originally stored in the first stage of the register has been moved through the register 200 to be stored in the last stage. The first three stages of the register 200 then once again all store a binary "0," causing a high input to be applied to the three inputs of the NAND gate 220 connected to the $\overline{Q}$ outputs of these first three stages. Storage of a binary "1" in the final stage of the register counter 200 causes the $\overline{Q}$ output of that stage to go low forcing the output of a NAND gate 232, connected as half of a received "0" decoder multivibrator along with a NAND gate 233, to go high if the multivibrator 232, 233 already is not in this state of operation. The corresponding NAND gate 233 then produces a low output holding the output of the NAND gate 232 high.

The Q output of the final or fourth stage of the register counter 200 goes high at 3 milliseconds enabling the NAND gate 221. At the same time, a message recognition NAND gate 235 is provided with a high enabling input from the output of a "0" recognition NAND gate 237 on one input thereof, and with another high input from an error recognition bistable multivibrator comprising a pair of NAND gates 240, and 241, with the NAND gate 241 being forced to produce a high output at the commencement of operation of the circuit due to the application thereto of the low output of the NAND gate 220 at the start of operation. As a consequence, the output of the NAND gate 235 is low forcing the output of the NAND gate 221 to be high; so that at 3 milliseconds, the output of the gate 220 once again becomes low, priming the "1" input to the first stage of the register counter 200.

When the trigger pulse next occurs at 4 milliseconds, the first stage of the counter 200 again stores a binary "1," causing the NAND gate 230 once again to produce a high output signifying the commencement of the mark portion of the next interrogation pulse. The foregoing cycle is continuously repeated, resulting in an interrogation sequence of 1 millisecond mark pulses each followed by 3 millisecond space pulses until a transponder station responds by transmitting data to the interrogation station.

As described previously in conjunction with the operation of the transponder shown in FIG. 2, the first data information transmitted by a transponder is a binary "1" which takes the form of a transmitted signal burst during the space interval immediately following any transmitted mark from the interrogation station.

Thus, during the space interval which follows the mark portion of an interrogation pulse, the first mark transmission from the transponder should be received during the space interval. At 3 milliseconds, as stated previously, the output of the NAND gate 220 goes low, this occuring one millisecond before the end of the interrogation pulse space interval. This output is doubly inverted by the pair of NOR gate inverters 224 and 243 to generate a one millisecond low strobe pulse applied to the NOR gate 40 shown in the receiver 26 of the interrogation station (FIG. 1).

If at this time a transmitted binary "1" is being received, both inputs to the NOR gate 40 are low, causing its output to become high. This output applied to the NAND gate 225, which already is enabled by the high input from the storage overflow circuit, produces a 1 millisecond low output from the NAND gate 225 which is inverted by the NOR gate 227 to cause a high enabling pulse to be applied to the "1" input of the multivibrator 224. At this time, both inputs to the NOR gate 222 are low during the three to 3.5 millisecond time interval causing a high output to be obtained therefrom. Upon the occurance of the next low-to-high pulse transition at the output of the NAND gate 214 at 3.5 milliseconds (having no effect on the operation of the counter 200), the output of the NOR gate 222 produces a high-to-low trigger pulse which is applied to the bistable multivibrator 224, causing the multivibrator 224 to store the binary "1" received data signal. A binary 1 stored in the multivibrator 224 causes the Q output to be high and the $\overline{Q}$ output to be low.

It should be noted that prior to this time the NOR gate 222 periodically produced such trigger pulses, but these prior trigger pulses had no affect on the operation of the multivibrator 224 since it was continuously primed with binary "0" priming signals.

At 4 milliseconds, the trigger pulse applied to the register 200 causes the storage of the binary "1," obtained from the output of the NAND gate 220, in the first stage of the register counter 200, as described previously, thereby causing the output of the NAND gate 220 to become high terminating the strobe input to the NOR gate 40 and terminating the sampling interval for the binary "1" received data.

Simultaneously with the storage of the binary "1" in the first stage of the register 200, a low-to-high pulse transition is applied from the data clock divider 21 to the input of the NOR gate 217 causing a high-to-low pulse transition to appear at the output of the NOR gate 217. This transition is differentiated in the differentiating circuit 229 producing a trigger pulse to cause the binary information stored in the bistable multivibrator 224 to be transferred into and stored in the bistable multivibrator 207, causing the Q output thereof to become high and the $\overline{Q}$ output to become low.

When this occurs, the NAND gate 210 of the received message bistable multivibrator produces a high output, with the output of the NAND gate 209 going low. This state of the multivibrator 209, 210 indicates that a message is being received and this multivibrator remains set to this state until reset upon the termination of a message, application of a clear pulse, or upon an error indication. The high output from the NAND gate 210 is utilized to enable a pair of NAND gates 237 and 245 corresponding, respectively, to the received "0" gate and a received "1" gate.

Since the first received information bit from the transponder is a binary "1," the other input to the NAND gate 245 is also high at this time, thereby causing the output of the NAND gate 245 to be low. This forces a high output from the NAND gate 237 which continues to enable the NAND gate 235 and forces the output of a "0" strobe NOR gate 247 to remain low, this output being inverted by a single input NOR gate 248 to produce a high input to the NOR gate 39, preventing sample for the presence of a received signal during the initial portion of the currently transmitted mark pulse interval of a verify "1" signal sequence from the interrogation station.

Once the received message bistable multivibrator 209, 210 has been triggered to the received message state, an additional NAND gate 249 is enabled by the output of the NAND gate 210, with the other input to the NAND gate 249 being obtained from the Q output of the second stage of the register counter 200. This insures that the transmitted mark from the interrogation station extends for at least two milliseconds, with the time interval from 0 to 1 milliseconds being controlled through the NAND gate 230, as described previously for the generation of the interrogation sequence, and with the Q output of the second stage of the counter register 200 being high during the interval from 1 to 2 milliseconds thereby producing a low output from the NAND gate 249 to hold the output of the NAND gate 230 high until the end of two milliseconds.

Since the received "0" NOR gate 39 is not strobed during the mark interval of a verify "1" signal sequence, all of the inputs to theNAND gate 230 once again are high at 2 milliseconds, causing the output to drop low to produce the second half or space pulse portion of the verify "1" signal shown in waveform B of FIG. 3. This corresponds to the first $R_1$ signal shown in the normal error free transmission set of waveforms illustrated in FIG. 4. If during the space portion of this first verify "1" sequence, a second binary "1" is being transmitted from a transponder unit, a signal is being received from the transponder during the space interval of the verify "1" being transmitted from the interrogation station. One millisecond prior to the end of this space interval the sampling of the received information in the NOR gate 40 again takes place due to the change of state of the NAND gate 220, as described previously, and the foregoing sequence is repeated.

Assume for the purposes of illustration that the third data bit to be received from a transponder is a binary "0." If this occurs, the entire second verify "1" mark and space sequence illustrated in the "Error Free" set of FIG. 4 passes by without any transmitted data being received by the trackside interrogation station. As a result, when the trigger pulse from the output of the NOR gate 222, occurs the output of the NAND gate 225 is high, priming the bistable multivibrator 224 to receive a binary "0." This causes the Q output of the multivibrator 224 to be low and the $\overline{Q}$ output to be high; and at 4 milliseconds, the trigger pulse obtained from the output of the NOR gate 217 causes this information to be stored in the multivibrator 207, changing the state of the multivibrator 207. The change of state has not affect on the received message bistable multivibrator 209, 210 but does force the output of the NAND gate 245 to become high. This high output applied to the input of the NAND gate 237 coincides with the high input to the NAND gate 239 obtained from the output of the NAND gate 210 to produce a low output from the NAND gate 237. A high output then is forced from the NAND gate 235, enabling the NAND gate 221 to extend the resetting of the NAND gate 220 to the 5 millisecond clock pulse transition.

At the same time, the "0" strobe NOR gate 247 is enabled by the low output of the NAND gate 237, which otherwise causes the output of the NOR gate 247 always to be low, which, upon inversion by the inverter NOR gate 248, produces a continuous high output to the NOR gate 39 preventing the sampling of input signals applied to the NOR gate 39 in FIG. 1. With this low enabling input applied to the NOR gate 247, however, the trigger or stepping pulse applied to the register counter 200 at 1 millisecond causes the "1" to be moved from the first stage to the second stage for the time period between 1 and 2 milliseconds. As a result, a low output is obtained from the $\overline{Q}$ output of the second stage producing low inputs at both of the inputs of the NOR gate 247; so that the output rises to a high level, inverted to a low level by the NOR gate 248, causing the "0" sample strobe to occur during the time period of 1 to 2 milliseconds. Since a received "0" always occurs during the first 1.5 milliseconds of a mark transmitted from the interrogation station, the "0" sample strobe is timed to coincide with a received "0" if one is being received.

Receipt of a binary "0" when the NOR gate 39 is strobed results in the output of the NOR gate 39 rising to a high level, inverted in a NOR gate 250, to produce a high-to-low pulse which applied to the NAND gate 233 in the received "0" bistable multivibrator forces the output of the NAND gate 233 to become high. This high output is applied to one of the two inputs of the NAND gate 232, the other input to which is the high $\overline{Q}$ output of the final stage of the register counter 200, so that the output of the NAND gate 232 drops from a high to a low value, forcing a high output to be obtained from a received "0" identification NAND gate 252. This high output is applied to one of the two inputs of the NAND gate 240 in the error bistable multivibrator thereby maintaining the output of the NAND gate 240 low, causing the output of the NAND gate 241 to remain high.

At the same time, the high output obtained from the NAND gate 235 enables a received zero control NAND gate 254, the other input to which is the Q output of the third stage of the register counter 200. Thus, as stated previously the output NAND gate 230 produces a high output for the first 2 milliseconds of each transmitted pulse interval so long as the received message NAND gate 209, 210 is set to indicate that a message is being received. When a binary "0" is identified, the storage of the "1" in the third stage of the register counter 200 causes the Q output of that stage to become high, which, combined with the high input obtained from the NAND gate 235 produces a low output from the NAND gate 254 holding the output of the NAND gate 230 high during the time interval from 2 to 3 milliseconds thereby extending the generation of the mark pulse interval portion to that of the verify "0" waveform C of FIG. 3, and as indicated for the third verification pulse interval in the normal "Error Free" set of waveforms illustrated in FIG. 4.

At the timing pulse occuring at 3 milliseconds, which steps the binary 1 into the fourth stage of the register counter 200, all of the inputs to the NAND gate 230 once again become high causing the output to become low to initiate the transmission of the space interval portion of the verify "0" signal. The NAND gate 220, however, is not enabled at this 3 milliseconds timing pulse due to the fact that the NAND gate 221 has a high enabling signal applied thereto from the output of the NAND gate 235. This output combines with the high output obtained from the Q output of the last stage of the register counter 200 during the time period from 3 to 4 milliseconds to cause the output of the NAND gate 220 to remain high until 4 milliseconds. At this time, the 4 millisecond timing and shift pulse clears the register 200, causing the output of the NAND gate 221 then to become high to produce low output from the NAND gate 220 during the time interval from 4 to 5 milliseconds. As a consequence, it may be seen that the trackside interrogation station verify "0" signal sequence is a 5 milliseconds in duration as compared with the verify "1" signal sequence which is 4 milliseconds in duration.

As soon as the output of the NAND gate 220 goes low, the strobe "1" signal is obtained from the output of the NOR gate 243, with the interrogation station logic system looking for the presence of transmitted binary "1" information from a transponder during the last millisecond of the verify "0" signal interval. If a received transponder signal is present at this time, the operation of the circuit as described previously for reception of a binary "1" takes place. If no signal is detected during this space interval, the system tentatively again identifies the absence of the signal as a binary "0," with verification taking place during the first portion of the succeeding cycle of operation of the register counter 200.

The foregoing operation continues for the duration of received messages from a transponder to identify the received data bits and to generate the corresponding verification signal sequences supplied to the transponder.

In order to utilize the received signals, a utilization device such as a printer, cathode ray tube display, or the like must be employed. Due to the fact that the signals received from the transponders occur at a very high rate it is necessary to provide a buffer memory between the trackside data logic shown in FIG. 5 and the printer or other utilization device which ultimately responds to the received messages to reproduce them in a usable form. A circuit providing such a buffer storage is shown in FIG. 6.

Initially when a power is applied to the logic shown in FIG. 5 it also is applied to the buffer storage circuit shown in FIG. 6, which includes a time delay circuit 300, responsive to the application of operating power to the system for delaying the application of a high enabling signal to a data input NAND gate 301, a load clock NAND gate 302, and an error clock NAND gate 303 and a low (inverted) enabling signal to a register full NOR gate 336 to prevent spurious operation of the buffer storage circuitry until the logic circuit shown in FIG. 5 has been cleared for initial operation as described previously. At the same time that power is applied to the time delay circuit 300, it also is applied as a reset pulse to the reset input of a six stage binary or ring counter 304 to set the counter to a count corresponding to a first one of six 16-stage shift register storage circuits 307 to 312, respectively.

The six stage counter 304 provides a high output corresponding to the selected shift register with the remaining outputs being low and the counter 304 operates sequentially in response to the application of stepping pulses applied to an input terminal 315 upon the completion of the storage of a message in one of the shift registers 307 to 312.

Initially assume that the first stage of the counter 304 is enabled causing a high output to be obtained from that stage and applied to the B input of the 16-stage shift register 307 and to a pair of NAND gates 319 and 320, enabling these NAND gates.

The Q output of the bistable multivibrator 224 (FIG. 5) provides the serial data input to the buffer register circuit and is connected to the other input of the normally enabled input NAND gate 301. Received binary "1" signals are in the form of high input pulses from the multivibrator 224 and received binary "0" signals are in the form of low input pulses. If the binary "1" signal condition is being received, the NAND gate 301 produces a low output which is inverted by a NOR gate inverter 322 to produce a high or enabling signal to the "1" or A inputs of all of the buffer storage registers 307 to 312. This information, however, cannot be loaded into the shift register 307 until a trigger or shift pulse is applied to the register.

The necessary shift pulses are in the form of load clock pulses obtained from the Q output of the first stage of the register counter 200 (FIG. 5) and are high pulses lasting for the time interval from 0 to 1 milliseconds in the operation of the register counter 200. These high pulses applied to the input of the NAND gate 302 produce a low output from the NAND gate 302, which in turn is coupled to one of two inputs of another NAND gate 326, the other input to which is obtained from the output of the NAND gate 306 which normally is high due to the fact that the output of the NAND gate 303 normally is low.

As a consequence, each time that a load clock pulse is received at the input of the NAND gate 302, a low-to-high pulse transition is obtained from the output of the NAND gate 326 and is applied to the other input of the NAND gate 319. This produces a high-to-low output pulse from the NAND gate 319 which is applied to the input of a clock pulse NAND gate 329 to produce a low-to-high pulse transition. This transition is inverted by a single input NOR gate inverter 330, as a high-to-low trigger or stepping pulse for the shift register 307.

Due to the fact that the B or "0" input to the shift register 307 is constantly primed from the output of the counter 304 for the duration of the time that the counter 304 is set to its first stage of operation, whenever the output of the NAND gate 332 is low, indicating tentative identification of a received "0", a 0 is stored in the input stage of the shift register 307. On the other hand when a binary "1" is being received, both the A and B inputs of the first stage of the shift register are primed by high inputs, and the parameters of the register are selected such that this causes the storage of a binary "1" in the input stage of the register when the load clock shift pulse is applied.

The serial data stream present at the output of the bistable multivibrator 224 is stored in the shift register 307, upon the application of the load clock pulses to the input of the NAND gate 302, until the first binary "1" (which is the first transmitted pulse received by the interrogation station since the transponder always initiates transmission with a binary "1") reaches the final or 16th stage of the shift register 307. This stage is identified in FIG. 6 as the "tag" stage, and a binary "1" stored in this stage causes a high output to be obtained therefrom. This high output applied to the other input of the already enabled NAND gate 320 causes the output of the NAND gate 320 to go low, forcing the output of a three input register monitor NAND gate 332 to go high. This high output is applied to a normally enabled NOR gate 334 to cause the output of the NOR gate 334 to drop from a high to a low value, which is applied to the other input of the NOR gate 336, producing a high output from the NOR gate 336 indicative that a complete message has been loaded in the register 307 and that the register is full.

The output from the NOR gate 336 is applied to one of two inputs of a message complete comparison NAND gate 260 (FIG. 5), the other input to which is the output of the received "1" NAND gate 245 after being inverted by a single input NOR gate 261. In the message format the last data bit transmitted by a transponder is selected to be a binary "1," so that reception of this sixteenth bit as a binary 1 produces a high output from the NOR gate 261, enabling the NAND gate 260. Thus, when the output of the NOR 336 goes high, indicating that the loading of the shift register 307 is complete, the output of the NAND gate 260 drops to a low value causing the output of a NAND gate 263 to rise to a high value. The NAND gate 263 forms one-half of a message complete multivibrator including a second NAND gate 264.

This high output of the NAND gate 263 is applied to one of two inputs of the NAND gate 264, the other of which is obtained from the Q output of the fourth stage of the counter register 200. Thus, at the three millisecond time interval following the reception of this final transmitted binary "1," the Q output of this final stage of the counter register rises from a low to high value causing the output of the NAND gate 264 to drop to a low value.

This output is utilized in the NAND gate 205 to force the output of the NAND gate 205 to become high which is inverted in the NOR gate inverter 206 to produce a low reset trigger pulse which clears the multivibrator 207 to its "0" state. At the same time, the received message multivibrator 209, 210 is reset, with the output of the NAND gate 209 being high and the output of the NAND gate 210 being low. This reset is comparable to the initial reset previously described for initiation of operation upon the application of the clear pulse to the NAND gate 205.

The output of the NAND gate 264 also is applied as the stepping pulse input to the six stage counter 304 at the terminal 315 to step the counter 304 to its next stage, thereby removing the enabling inputs from the NAND gates 319 and 320 associated with the shift register 307. The second stage of the binary counter 304 then enables the operation of the buffer storage circuit shift register stage 308, which includes a corresponding set of gates 319, 320, 329 and 330 which have been described in conjunction with the operation of the shift register stage 307.

Operation of the system then continues to store successive messages in successive ones of the buffer storage shift registers 307 to 312 with the counter 304 being stepped upon the filling of each register 307 to 312 as determined by detection of a binary "1" in the tag stage of the shift registers. In this manner, the complete sixteen bit messages are sequentially stored in different ones of the registers 307 to 312.

It should be noted that upon the occurance of the 4 millisecond clock pulse, the Q output of the final stage of the register counter 200 (FIG. 5) once again becomes low forcing the output of the NAND gate 264 to become high. This high output coincides with a high output from the NAND gate 260 which is produced by the stepping of the counter 304 to the next buffer storage stage which then causes the output of the NOR gate 336 to be low. As a consequence, the message complete multivibrator 263, 264, is switched back to its original state of operation, with the output of the NAND gate 264 remaining high and the output of the NAND gate 263 being low, holding the NAND gate 264 high. This then enables the NAND gate 205 to respond to reset clear pulses or error pulses applied to the other two inputs thereof. So long as all three of the inputs to the NAND gate 205 are high, however, its output remains low, causing a high output to be obtained from the inverter 206 to enable the received message multivibrator 209, 210 to respond to the first received data bit of the next received message.

The foregoing sequence of operation continues for filling the shift registers in each of the buffer storage circuits 307 to 312 as described previously.

In order to utilize the information stored in the buffer storage circuits 307 to 312 in a suitable utilization device such as a printer 340, a register unload control circuit 341 and a second six stage counter 343 are provided. When the power up reset pulse is applied to the six stage counter 304 to set that counter to a count of 1, corresponding to the first register 307, the counter 343 is similarly reset to a count of 6, corresponding to the final register 312 of the buffer storage circuits.

Thus, the first stepping or advance pulse applied to the counter 343 steps the counter from stage 6 to stage 1 whereas the first stepping pulse applied to the counter 304 steps the counter from stage 1 to stage 2. As a consequence, it may be seen that the counter 343 is sequentially stepped to follow the stepping of the counter 304; so that initially control of the operation of the shift register 307 is effected by the counter 304 without interference from the output of the counter 343.

Assume that the first received message is stored in the register 307 and the counter 304 is stepped to its second stage enabling the register 308 for storage of the second message in the manner described previously. If at this time it is desired to supply the first message to the printer 340, the register unload control circuit 341 produces a high advance or stepping pulse on a lead 345 to a NAND gate 346, which normally is enabled by a high input on its other input. This causes a high-to-low pulse transition to appear at the output of the NAND gate 346 to step the counter 343 from stage 6 to stage 1.

When the counter 343 is stepped to stage 1, the output of stage 1 goes high and is applied over a lead 348 to enable a pair of NAND gates 350 and 351 in the register stage 307. At this time it should be noted that the NAND gates 319 and 320 are disabled since the counter 304 has been stepped to stage 2. The register unload control circuit 341 then provides transmit clock pulses over a lead 353 to the NAND gate 350 to control the stepping or shifting of the information out of the shift register from the final stage through the now enabled NAND gate 351, a NAND gate 355, and NOR gate 357 to produce the binary serial train to the register unload control circuit 341. The control circuit in turn supplies the necessary signal format to the printer 340.

The control circuit 341 includes a counter for counting the number of transmit clock pulses applied to the register 307; and when 16 clock pulses have been recorded, a stepping pulse is applied over the lead 345 to the NAND gate 346 to step the counter 343 to the next register, with the sequence then being repeated. It should be noted that NAND gates 350 and 351 are provided in each of the buffer circuits 307 to 312 but are energized for only a single buffer storage circuit stage at a time, with the remaining stages being prevented from applying output signals to the register unload control circuit 341.

It is apparent that erroneous operation of the storage and removal of data from the buffer storage circuits 307 to 312 would occur if an attempt were made simultaneously to store information in a storage register and to obtain information from the register. To prevent this from occuring, a pair of NAND gate comparison tree circuits 350 and 351 are provided, with the circuit 350 providing a low output whenever the counters 304 and 343 both are stepped to the same stage. For example, if the counters 304 and 343 both were stepped to stage 2, the buffer storage circuits all would be full and an attempt then would be made by the counter 304 to enable the storage circuit 308 from which information was presently being removed, for the reception of new data. When this occurs, the high output from the NAND gate tree 350 is inverted by a NOR gate inverter 350A and is applied to the input of the clock NAND gate 302 forcing the output thereof to go high, which in turn results in a low output from the NAND gate 326 thereby disabling the application of the clock signals to any of the buffer storage circuits 307 to 312 from the logic circuit shown in FIG. 5.

At the same time, the low output of the inverter 350A is applied to the storage overflow input of the input NAND gate 225, (FIG. 5) to render the NAND gate 225 insensitive to input signals and forcing its output to go high, indicative of a continuous received binary "0" signal. This in turn forces an error in the logic, which is transmitted to the vehicle attempting to supply data to the interrogation circuit to cause a resetting of the transponder for a subsequent attempt at transmission to the trackside interrogation unit. As soon as the counter 343 is stepped to the next stage, however, the inverted output of the NAND gate tree 350 rises to a high value, permitting resumption of the normal operation of the circuit by removing the inhibiting signals from the NAND gates 302 and 225.

Similarly, it is desired to prevent the register unload control circuit 341 from initiating the removal of information from a buffer storage circuit 307 to 312 when the storage circuit is empty. This is accomplished by the NAND gate tree 351, which compares each of the outputs of the six stage counter 304 with the next preceeding corresponding output of the counter 343 to produce a low output from a NOR gate inverter 351A. This output is applied to the input of the NAND gate 346, forcing its output to go high to prevent further stepping of the counter 343.

For example if the counter 304 is set to stage 2, corresponding to an attempt to supply information to the buffer storage circuit 308, the counter 304 remains set to this stage continuously permitting the application of input data to the register 308 until a tag binary "1" pulse reaches the sixteenth stage of the register 308. Until this occurs, no further stepping of the six stage counter 304 takes place. If, in the meantime, the register unload control pulse applied over the lead 345 through the NAND gate 346 steps the counter 343 from stage 6 to stage 1 to permit the removal of information from the register 307, coincidence of this output of stage 1 of the counter 343 with the output of the second stage of the counter 304 produces a low output from the NAND gate tree circuit inverter 351A. This output then inhibits the passage of further stepping pulses through the NAND gate 346. Thus, the counter 343 cannot be stepped from stage 1 to stage 2 so long as the second buffer storage circuit 308 is being controlled by the input 304.

The foregoing describes the manner in which the system at the interrogation station performs for error-free operation to produce a sequence of signals as indicated in the Error Free set shown in FIG. 4. Previously, the operation of the transponder upon receipt of incorrect verification signals has been described and the manner of operation of the circuit logic shown in FIG. 5 upon detection of an error now will be described.

As stated previously, when a binary "0" data bit is to be transmitted, the transponder in the vehicle does not transmit any information during the time that a binary "1" would have been transmitted during the transmission of a space interval following any mark interval from the interrogation station. At the interrogation station, the lack of reception of a binary "1" during the space interval is tentatively identified as a binary "0" which will be transmitted during the next mark transmission from the interrogation station. This causes the interrogation station, through the operation of the NAND gate 237 and NAND gate 254 to commence transmission of a verify "0" signal sequence, commencing with a three millisecond mark interval.

Thus, during normal reception of a received "0" signal the output of the NAND gate 232 is low during the period from 1 millisecond, marking the beginning of the received "0" low output from the NOR gate 250, until 3 milliseconds when the Q output of the final stage of the counter register 200 becomes low, forcing the output of the NAND gate 232 to be high. As a consequence, the output of the NAND gate 252 remains high for this first three millisecond interval to prevent setting of the error bistable including the NAND gates 240 and 241. In the event, however, that no received "0" signal is decoded in the NOR gate 39 (FIG. 1), the NAND gate 233 remains in a low output condition for the time interval from 1 to 3 milliseconds, with the NAND gate 232 producing a high output throughout this time interval. As a consequence, when the counter register 200 is stepped to store the "1" in the third stage at the 1 millisecond interval, all three inputs to the NAND gate 252 are high, causing a low output pulse to be obtained therefrom. This pulse, applied to the input of the NAND gate 240 in the error bistable circuit 240, 241 forces the output of the NAND gate 240 to be high at the 2 millisecond time interval. This output coincides with the other high input applied to the input of the NAND gate 241 to cause the output of the NAND gate to go low at the 2 millisecond interval.

The low output of the NAND gate 241 is applied to the input of the NAND gate 303 in the storage register circuit shown in FIG. 6 to force the output of the NAND gate 303 to be high, enabling the NAND gate 306 to pass high frequency clock pulses from a suitable source such as a point on the frequency divider chain of FIG. 1 (these clock pulses for example may be 64 kilohertz in frequency). These pulses then are applied through the NAND gate 326 to the register in which the message is being stored to rapidly clear the register to store all 0 information.

At the same time, this low output at 2 milliseconds from the bistable multivibrator 241 is applied to the input of the NAND gate 230 (FIG. 5) to maintain the output of the NAND gate 230 high until the error bistable 240, 241 is reset. This does not occur until the output of the NAND gate 220 goes low at four milliseconds, thereby causing the transmission of an error signal of the type shown in waveform D of FIG. 3 and as indicated as "error" in the various waveforms shown in FIG. 4. The response of the vehicle transponder to an error signal is the same, irrespective of the manner in which the error was caused, since the vehicle transponder fails to see a mark-to-space transition during either the verify "1" or verify "0" intervals in the transponder comparison circuit. As stated previously, this causes the transponder to revert to a mode in which it commences counting received interrogation pulses from the interrogation station.

It further should be noted that, in the interrogation station, the error pulse obtained from the output of the NAND gate 241 also is applied through the NAND gate 205 and NOR gate 206 to reset the bistable 207 and the received message bistable 207; so that the interrogation station reverts to its interrogation transmit mode of operation.

In summary, it is possible to obtain an error in the transponder/verification signal sequence in any one of four different ways which are identified in FIG. 4 by the sets of waveforms labeled "Error 1" through "Error 4". In "Error 1", the vehicle transmits a binary "1" but does not receive the verify "1". In the vehicle transponder further transmission is terminated due to the non verification of the transmitted binary "1". The trackside interrogation station identifies this as a tentative transmitted binary "0" and responds by transmitting a verify "0. " Since no binary "0," however, is received, the transmitter continues the duration of the mark interval to form the error signal of waveform D in FIG. 3. Following this, the trackside interrogation station reverts to the transmission of the interrogation signal sequence.

The second error possibility (Error 2 of FIG. 4) is when a binary "0" is being transmitted and the vehicle misses the verify "0" signal for some reason. The vehicle then ceases transmission since it did not receive the verify "0", and the transmitter identifies a tentative "0" as in the previous example. Again, as in the previous example, the trackside interrogation station reverts to the error mode followed by the interrogation mode of operation as described in conjunction with the example for error 1.

A third type of error (Error 3 of FIG. 4) which may occur is when a binary "1" is transmitted but is missed by the interrogation station receiver. At the interrogation station this is identified as a tentative 0 and a verify "0" is transmitted. Since the mark-to-space transition, however, does not occur during the binary "1" window being utilized for comparison in the transponder, no verification takes place and the vehicle ceases transmission. This is identified in the interrogation station as a tentative received "0". Since no 0 in fact is received, the signal is extended to an error signal followed by the reversion of the interrogation station transmitter to the interrogation mode of operation.

The fourth type of error which can occur (Error 4 of FIG. 4) is when a binary "0" is being transmitted by a transponder and is missed at the interrogation receiver. At the interrogation station a tentative "0" is identified and a verify "0" sequence commences. Since the received binary "0" is not detected at the interrogation station, however, the verification signal is extended to an error signal; and the transmitter at the interrogation station reverts to the interrogation mode of operation. At the vehicle, no verification of the transmitted "0" data bit takes a place; so that the vehicle ceases transmission again reverting to a mode of counting the interrogation pulses followed by reinitiation of transmission as described previously.

It further is possible, because of the random address provided by the shift register counters in the vehicle transponders, that two or more vehicle units may initiate transmission at the same time. If phase cancellation of the signals takes place, the trackside interrogation station continues to transmit the interrogation pulses and the vehicle units fail to obtain verification and revert the interrogation reception mode. If the signals do not phase cancel, however, a verify "1" is transmitted by the trackside interrogation station and is used in each of the vehicles to verify that the first transmitted binary "1" was properly received in the interrogation station receiver. In the sequence of operation which has been described previously, however, it should be noted that the binary "1" transmitted from a vehicle transponder is transmitted prior to the time that a binary "0" is transmitted for the same bit position. As a consequence, since the binary "1" for any bit position is sent first, a verify "1" is transmitted by the trackside interrogation station. As a result the vehicle transponder which transmits a binary "1" receives proper verification and proceeds with transmission but the vehicle transponder which transmits the first binary "0", in a bit position in which the other transponder transmits a binary "1," fails to receive verification and resets as in the case of the "Error 2" which has been described above. This operation is illustrated in FIG. 4 in the set of waveforms labeled "Simultaneous vehicle transmission."

The message bits are always followed by a last binary "1" transmission by the vehicle which can be programmed as described previously by causing the first stage of the vehicle transponder shift register 80 to be set to store a binary "1" when the shift register 80 is reset for transmission of the second eight bits of information from the transponder. This is necessary since the last digit transmitted by the vehicle is only partially checked by the trackside interrogation station. As a result all of the message bits then are provided with maximum error checking security.

In conjunction with the description of the operation of FIG. 1 it should be noted that a noise strobe is supplied by the data input and system logic 11 to the sample and hold circuit 35 to establish the reference level for operation of the signal detection differential amplifier 37. In addition the input and system logic circuit 11 provides a dump signal to the amplifier 30 to reset the reference levels for the peak detectors 31 and 33. These two signals are obtained from the interrogation station logic shown in FIG. 5 as follows:

A noise strobe NAND gate 270 is enabled by the high output of the NAND gate 237 following receipt of each binary "1" from the transponder and while in the interrogation mode, and is provided with a second high input during the 1 to 2 millisecond interval from the Q output of the second stage of the register counter 200. Coincidence of these two inputs causes the gate 237 to produce a 1 millisecond long low "noise strobe" pulse to the sample and hold circuit 35. It should be noted that no "noise strobe" pulse is produced after receipt of a binary "0" since the output of the NAND gate 237 is low at the time the second stage of the counter 200 provides the output to sample the gate 270.

The dump signal is provided during the receive message mode only, and following a received "1" the output of the NAND gate 245 is low, enabling a NOR gate 271. Two other inputs to the NOR gate 271 are provided, one by the $\bar{Q}$ output of the first stage of the register counter 200 and the other from the NAND gate 214. These both are low, causing a high output to be applied from the NOR gate 271 to an output NOR gate 273, driving the output low. This condition remains until 0.5 milliseconds when the output of the NAND gate 214 again rises, causing the output of the NOR gates 271 and 273 once again to become low and high, respectively.

Following receipt of a "0" the output of the NOR gate 271 remains low, enabling the NOR gate 273. A NOR gate 274 is enabled by the then low output of the NAND gate 237; and during the time interval of 2.0 to 2.5 milliseconds, the $\bar{Q}$ output of the third stage of the register counter 200 and the output of the NAND gate 214, the other two inputs to the NOR gate 274 are low. Thus, a high input is supplied to the NOR gate 273 to produce a low dump pulse at its output during the 2.0 to 2.5 millisecond time interval.

I claim

1. A signalling system for identifying and monitoring a transponder unit including in combination:
   a transponder unit including means normally in an initial condition for transmitting a unique signal train upon receipt of a transmitted interrogation signal;
   an interrogation unit including means for generating and transmitting said interrogation signal and for receiving said unique signal train;
   means in the interrogation unit responsive to reception of said unique signal train for terminating transmission of said interrogation signal and for initiating transmission of a verification signal train corresponding to the received signal train;
   means in the transponder unit for comparing the verification signal train with the transmitted unique signal train and producing an output upon failure of verification;
   means in the transponder unit for terminating transmission from and for resetting the means for transmitting the unique signal train in the transponder unit to the initial condition in response to said output from the comparing means; and
   means in the interrogation unit for causing the interrogation unit to revert to transmission of the interrogation signal upon termination of transmission by the transponder unit.

2. The combination according to claim 1 wherein the verification signal train is transmitted simultaneously from the interrogation unit with transmission of the unique signal train from the transponder unit.

3. The combination according to claim 1 further including means responsive to the received verification signal train for controlling the operation of the means for transmitting the unique signal train from the transponder unit.

4. The combination according to claim 1 further including utilization circuit means and means in the interrogation unit for decoding the unique signal train transmitted thereto from the transponder unit and for supplying the decoded signal to utilization circuit means; and wherein the unique signal train is composed of signals of a plurality of types and the verification signal train is transmitted to the transponder simultaneously with receipt of the unique signal train from the transponder, the verification signal sequence being in the form of a pulse sequence of a different predetermined relationship for verification of received signals of each of said types.

5. The combination according to claim 4 wherein two types of signals are transmitted by the transponder unit, both types being in the form of pulses of a predetermined type, the time of transmission of said pulses with respect to the verification signal train being transmitted by the interrogation unit determining which of the two types of signals is being transmitted by the transponder unit.

6. The combination according to claim 5 wherein the verification signal sequences are in the form of mark and space pulse sequences, and further including a shift register means for supplying the unique signal train from the transponder, the shift register supplying signals of first and second types and wherein a signal of said one of said two types transmitted by the transponder unit is generated in response to a first type of signal supplied by the shift register simultaneously with a received space signal in the verification signal train and wherein transmission of a signal of said other of said two types from the transponder unit is generated in response to a second type of signal supplied by the shift register simultaneously with the receipt of a mark signal in the verification signal train from the interrogator unit.

7. The combination according to claim 6 further including means responsive to mark-to-space transitions in the received verification signal train for providing a sequence of shift pulses to the shift register to shift the same.

8. The combination according to claim 4 wherein the unique signal train comprises a message having a predetermined number of bits of information and the utilization circuit means includes a plurality of buffer storage register means each having a capacity for storing at least one message with means for supplying the message at an input bit rate to the register means for storage therein and further including output utilization means operable at an output bit rate different from the input bit rate at which the message is supplied to the register means, with means responsive to the storage of the message in a register means for enabling the output utilization means to remove the message from the register at said output bit rate.

9. The combination according to claim 8 wherein the plurality of register means includes at least two register means and further including means responsive to the filling of one of said register means for preventing the application of further information bits thereto and for transferring the application of information bits to the other of the register means first comparison means for sensing when all of said plurality of registers have been filled with messages for preventing the application of further information bits to the register means, and second comparison means for sensing when all of the registers are emptied for preventing the output utilization means from removing further information from said registers.

10. The combination according to claim 9 further including means for sequentially enabling the shift register means, wherein each register means has a capacity equal to the number of bits in each message, with first shift pulses for the shift register means being supplied to the shift registers at the input signal rate for storing data in the enabled shift register, with means for preventing the application of said first shift pulses to a register means upon the filling of the register means and for transferring control of the shift register means to the output utilization means, the output utilization means applying second shift pulses to the register at said output bit rate.

11. A signalling system for identifying and monitoring a transponder unit with an interrogation station transmitting interrogation and verification signals, the system including in combination:
   transmission means in said transponder unit operable upon receipt of a transmitted interrogation signal for generating and transmitting a unique signal from said transponder unit;
   means in the interrogation station responsive to the signals received by the interrogation station from the transponder unit for generating a sequence of verification signals for verifying said received signals;
   means in the transponder unit for comparing received verification signals with the transmitted unique signal for producing an output upon failure of verification; and
   means for terminating transmission from the transponder unit and for resetting the transmission means of the transponder unit to an initial condition in response to said output of the comparing means, causing the transponder unit to be rendered responsive to a transmitted interrogation signal for reinitiating transmission therefrom.

12. The combination according to claim 11 wherein the transponder unit transmits signals of first and second binary conditions and the verification signal sequence supplied by the interrogation station includes signal intervals of a first predetermined pattern for verifying said first binary condition and signal intervals of a second predetermined pattern for verifying said second binary condition, the transponder further including first clock circuit means enabled for operation during one of the signal intervals of each of the received verification patterns, the comparing means including gate circuit means responsive to the received verification signal, the transponder signal, and the output of the first clock circuit means for producing said output upon failure of verification.

13. The combination according to claim 12 wherein the first and second binary conditions are binary "1" and binary "0," respectively and the signal format of the verification signal is such that the verification pattern for a binary "1" received from the transponder unit is in the form of a mark pulse of a first predetermined length followed by a space pulse of a first predetermined length and wherein the verification pattern for a binary "0" received from the transponder unit is in the form of a mark pulse of a second predetermined length followed by a space pulse of a second predetermined length, the length of at least one of the mark or space pulses used for verifying a binary "1" being different from the length of the corresponding mark or space pulses in the verification pattern for a binary "0," with the gate circuit means including first and second verifier gates, the first gate being enabled by a binary "1" from the transponder and the second gate being enabled by a binary "0" from the transponder, with pulses from the first clock means being applied successively to the first and second verifier gates to produce outputs therefrom coinciding with the expected mark-to-space transitions in the verification patterns, and means responsive to the verification signal and the outputs of the first and second verifier gates for producing said output upon failure of the mark-to-space transitions of the verification signal to occur during the time an output is present from the first or second verifier gate.

14. The combination according to claim 12 further including a multi-stage shift register in the transponder with further gate circuit means interconnecting the output and input of the shift register to cause the register to be operated as a maximum sequence counter; means responsive to the interrogation signals for supplying shift pulses to the shift register; means responsive to a first predetermined code pattern stored in the shift register for enabling the transmission initiating means and for disabling the further gate means, permitting operation of the register as a shift register means responsive to operation of the transmission initiating means for storing a predetermined code pattern in the shift register corresponding to the sequence of first and second binary conditions to be transmitted from said transponder, the output of the final stage of the shift register providing the transponder output, and means responsive to pulse transitions in the received verification signal patterns for providing shift pulses for the shift register.

15. A transponder for use in a signalling system including an interrogation station transmitting a sequence of interrogation signals, the transponder including in combination:
a multistage shift register means, having at least an input stage and an output stage, each stage of the shift register means capable of being set to either first or second states of operation corresponding to two binary conditions and the stages storing an initial sequence of binary conditions upon initial energization;
means responsive to the interrogation signals for providing a sequence of shift pulses to the shift register to shift the same;
means coupled with the input stage of the shift register for causing the shift register to be filled with a first predetermined pattern of binary conditions in response to the application of shift pulses thereto;
means coupled with the shift register for sensing the storage of said first predetermined pattern therein to produce a control signal;
means responsive to the control signal for supplying a second predetermined binary sequence for storage in the shift register; and
gate means responsive to the control signal and the output of the output stage of the shift register for providing an output signal train from the transponder.

16. The combination according to claim 15 wherein the first predetermined pattern is all stages of the shift register set to said first state of operation.

17. The combination according to claim 15 whereby the initial binary sequence established in the shift register upon initial energization is a random sequence and the means for causing the shift register to be filled with a first predetermined pattern of binary conditions includes second gate means responsive to the output of the output stage of the shift register for causing the register to be operated as a maximum sequence counter, the second gate means being disabled in response to said control signal.

18. The combination according to claim 15 further including means for transmitting said output signal train from the transponder and wherein the interrogation station further transmits a sequence of signals uniquely verifying signals received by the interrogation station from the transponder, the transponder further including means responsive to the receipt of the verification signals for providing shift pulses to the shift register.

19. A buffer storage circuit for temporarily storing messages in the form of a binary bit train of a predetermined length supplied to the buffer storage circuit at one bit rate and removed from the buffer storage circuit at a second bit rate including in combination:
a plurality of storage register means each having a capacity for storing at least one of said messages;
input control means for sequentially enabling the storage registers for the receipt of an input message;
input load means responsive to enabling of a register by the input control means to cause the storage of information therein at the bit rate of an input message;
first means coupled with the storage register means and responsive to the storage to capacity of a storage register means for causing the input control means to enable the next register in the sequence for the receipt of an input message;
register unload control means; and
second means coupled with the storage register means and responsive to the storage to capacity of a register for enabling the register unload control means to remove the message from the register at said second bit rate.

20. The combination according to claim 19 further including inhibiting means responsive to the storage to capacity of all of said plurality of registers for inhibiting operation of the input load means.

21. The combination according to claim 20 wherein the second means further senses completion of removal of a message from a register by the unload control means to enable the unload control means to remove a message from the next filled register in the sequence.

22. The combination according to claim 21 wherein the input control means includes a first counter means having a predetermined number of outputs corresponding to the number of register means and the second means includes a second counter means having a predetermined number of outputs corresponding to the number of register means and advanced to enable removal of messages sequentially from the register means, and wherein the inhibiting means includes first gating means responsive to corresponding outputs from the first and second counter means indicative that information has not been removed from the register to which the first counting means has progressed for inhibiting operation of the input load means and further includes second gating means responsive to a combination of outputs of the first and second counter means, with the output of the second counter means corresponding to the register just prior to the one in the sequence which is enabled by an output from the first counter means, for inhibiting operation of the register unload control means.

23. A dual mode register circuit including in combination:
a multistage shift register means having at least an input stage and an output stage, each stage of the shift register means capable of being set to either first or second states corresponding to two binary conditions, and the stages storing information in the form of an initial sequence of binary conditions upon initial energization thereof;

means for providing a sequence of shift pulses to the register means to shift said information from the input stage to the output stage;

first gate means responsive to the output of the output stage of the register means for supplying input signals to the input stage of the register means to cause the register means to be operated as a maximum sequence counter;

means responsive to the storage of a predetermined information pattern in the register means for producing a control signal;

means responsive to the control signal for supplying a predetermined binary sequence for storage in the register means;

means responsive to the control signal for disabling operation of the gate means to cause a predetermined binary condition to be applied to the input stage of the register means; and second gate means responsive to the control signal and the output of the output stage of the register means for providing an output signal train from the register means.

24. The combination according to claim 23 wherein the first gate means coupled with the output stage of the register means has at least first and second inputs, with the first input thereof being connected the output of the output stage of the register means; and wherein the means for producing the control signal is a bistable multivibrator having first and second states of operation, and being set to a first state of operation supplying an enabling signal to the second input of the first gate means, with the output of the first gate means being coupled with the input of the input stage of the shift register and operating in response to the output of the output stage of the shift register to cause the shift register to be operated as a maximum sequence counter, the combination further including means coupled with the register means and responsive to the storage of the predetermined information pattern for causing the bistable multivibrator to change states of operation, thereby disabling the first gate means, causing a predetermined input to be supplied to the input stage of the register means so that further application of shift pulses thereto causes the register means to operate as a shift register.

25. A signalling system for identifying and monitoring a transponder unit with an interrogation station transmitting interrogation and verification signals, the system including in combination:

a multi-stage register means in the transponder and having at least an input stage and an output stage, each stage of the shift register means capable of being set to either first or second stages of operation corresponding to two binary conditions and the stages storing an initial random sequence of binary conditions upon initial energization thereof;

means responsive to the interrogation signals for providing a sequence of shift pulses to the shift register to shift information stored therein from the input stage to the output stage;

first gate means responsive to the output of the output stage of the shift register means for supplying signals to the input stage thereof to cause the register means to operate as a maximum sequence counter;

means responsive to the storage of a maximum sequence count in the shift register for producing a control signal;

means responsive to the control signal for disabling the gate means, to enable the register means to be operated as a shift register;

transponder signal input means responsive to the control signal for supplying a predetermined unique binary sequence for storage in the shift register means;

transmission means in the transponder unit responsive to the control signal and the output of the output stage of the register means for providing an output signal train from the transponder;

means in the interrogation station responsive to the signals received by the interrogation station from the transponder unit for generating a sequence of verification signals verifying said received signals;

means responsive to the verification signals for providing a sequence of shift pulses to the shift register to shift the same;

means in the transponder unit for comparing the received verification signals with the transmitted unique binary sequence for producing an output upon failure of verification; and means for terminating transmission from the transponder unit and for enabling the first gate means to cause the register means once again to be operated as a maximum sequence counter, the initial count stored therein corresponding to the states of the shift register stages at the time transmission is terminated, said means for terminating transmission further causing the control signal to be terminated and the transponder unit to be rendered responsive to transmitted interrogation signals for providing said sequence of shift pulses to the shift register.

* * * * *